US009836162B2

(12) United States Patent
Yang et al.

(10) Patent No.: US 9,836,162 B2
(45) Date of Patent: *Dec. 5, 2017

(54) MOBILE TERMINAL PERFORMING A DIFFERENT OPERATION BASED ON A TYPE OF A TAP APPLIED TO A DISPLAY AND CONTROL METHOD THEREOF

(71) Applicant: LG ELECTRONICS INC., Seoul (KR)

(72) Inventors: Eunmo Yang, Seoul (KR); Hangshin Cho, Seoul (KR); Joonwon Byun, Seoul (KR); Jeunguk Ha, Seoul (KR); Mansoo Sin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,958

(22) Filed: Jun. 14, 2017

(65) Prior Publication Data

US 2017/0285851 A1    Oct. 5, 2017

Related U.S. Application Data

(63) Continuation of application No. 14/389,990, filed as application No. PCT/KR2013/011885 on Dec. 19, 2013.

(30) Foreign Application Priority Data

Aug. 6, 2013   (KR) ................. 10-2013-0093363

(51) Int. Cl.
*G06F 3/041*  (2006.01)
*G06F 3/01*   (2006.01)
(Continued)

(52) U.S. Cl.
CPC .............. *G06F 3/0416* (2013.01); *G06F 3/01* (2013.01); *G06F 3/041* (2013.01); *G06F 3/0412* (2013.01);
(Continued)

(58) Field of Classification Search
CPC .... G06F 3/0416; G06F 3/0412; G06F 3/0141; G06F 3/04883
See application file for complete search history.

(56) References Cited

U.S. PATENT DOCUMENTS 8,811,948 B2    8/2014  Bandyopadhyay et al.
2004/0001049 A1 1/2004  Oakley
(Continued)

FOREIGN PATENT DOCUMENTS

CN    103019796 A    4/2013
EP    2 849 041 A1   3/2015
(Continued)

OTHER PUBLICATIONS

EPO Search Report for Application No. EP 13886627.2, dated Apr. 6, 2016, 12 pages.
(Continued)

*Primary Examiner* — Lisa Landis
(74) *Attorney, Agent, or Firm* — Birch, Stewart, Kolasch & Birch, LLP

(57) ABSTRACT

A mobile terminal including a display; a touch sensor configured to detect a touch input on the display; and a controller configured to activate the display and periodically drive the touch sensor with a first period; deactivate the display in response to a predetermined condition and periodically drive the touch sensor with a second period greater than the first period; detect a first tap input applied on the touch sensor in state of the deactivated display; determine a region of the display that corresponds to the first tap input;
(Continued)

detect a second tap input applied on the touch sensor in state of the deactivated display within a predefined time period from the first tap input; determine if the second tap input is applied within the region; in response to the second tap input being applied within the region of the display that corresponds to the first tap input, activate the display and periodically drive the touch sensor with the first period; and in response to the second tap input being applied to a spot outside the region of the display that corresponds to the first tap input, maintain the deactivation of the display and periodically drive the touch sensor with the second period.

15 Claims, 31 Drawing Sheets

(51) Int. Cl.
    *H04B 1/40*         (2015.01)
    *H04M 1/725*      (2006.01)
    *G06F 3/0488*     (2013.01)
    *H04M 1/67*        (2006.01)

(52) U.S. Cl.
    CPC ........ *G06F 3/0414* (2013.01); *G06F 3/04883* (2013.01); *H04B 1/40* (2013.01); *H04M 1/72522* (2013.01); *G06F 2200/1636* (2013.01); *H04M 1/67* (2013.01); *H04M 1/7253* (2013.01); *H04M 2250/12* (2013.01); *H04M 2250/22* (2013.01)

(56) References Cited

U.S. PATENT DOCUMENTS

| | | |
|---|---|---|
| 2005/0024341 A1 | 2/2005 | Gillespie et al. |
| 2008/0165161 A1 | 7/2008 | Platzer et al. |
| 2008/0188267 A1 | 8/2008 | Sagong |
| 2009/0194341 A1 | 8/2009 | Nousiainen |
| 2009/0239581 A1 | 9/2009 | Lee |
| 2010/0066677 A1 | 3/2010 | Garrett et al. |
| 2010/0194703 A1 | 8/2010 | Fedor et al. |
| 2011/0080349 A1 | 4/2011 | Holbein et al. |
| 2011/0175844 A1 | 7/2011 | Berggren |
| 2011/0279393 A1 | 11/2011 | Okada et al. |
| 2012/0044199 A1 | 2/2012 | Karpin et al. |
| 2012/0092383 A1 | 4/2012 | Hysek et al. |
| 2012/0154292 A1 | 6/2012 | Zhao et al. |
| 2012/0192056 A1 | 7/2012 | Migos et al. |
| 2012/0236026 A1 | 9/2012 | Hinckley et al. |
| 2013/0100044 A1* | 4/2013 | Zhao .................. G06F 1/1694 345/173 |
| 2013/0120260 A1 | 5/2013 | Piot et al. |
| 2014/0168126 A1 | 6/2014 | Yu |
| 2014/0375596 A1 | 12/2014 | Kim et al. |
| 2014/0379341 A1 | 12/2014 | Seo et al. |

FOREIGN PATENT DOCUMENTS

| | | |
|---|---|---|
| JP | 2012-146156 A | 8/2012 |
| KR | 10-2010-0023326 A | 3/2010 |
| KR | 10-2010-0052378 A | 5/2010 |
| KR | 10-2011-0054415 A | 5/2011 |
| KR | 10-2013-0081673 A | 7/2013 |
| WO | WO2013/057048 * | 4/2013 |
| WO | WO 2013/057048 A1 | 5/2013 |

OTHER PUBLICATIONS

EPO Search Report for Application No. EP 13886627.2, dated Aug. 3, 2016, 18 pages.

PCT Written Opinion of the International Searching Authority for International Application No. PCT/KR2013/011885, dated Apr. 30, 2014, 1 page.

* cited by examiner

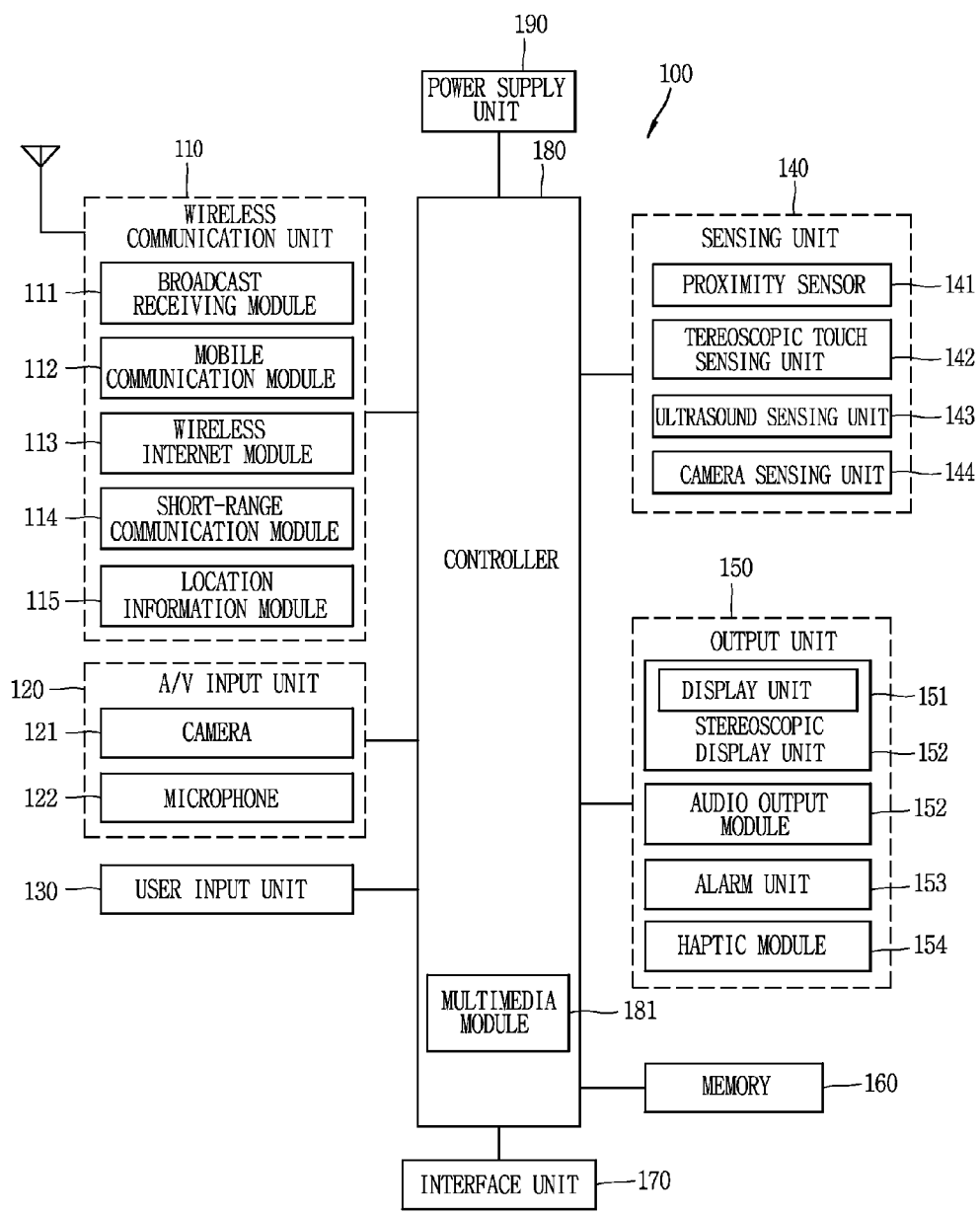

FIG. 7B
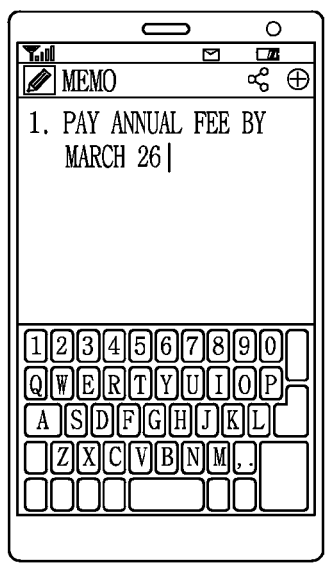
(a) → WHEN SCREEN IS TURNED OFF DUE TO TIMEOUT → (b)
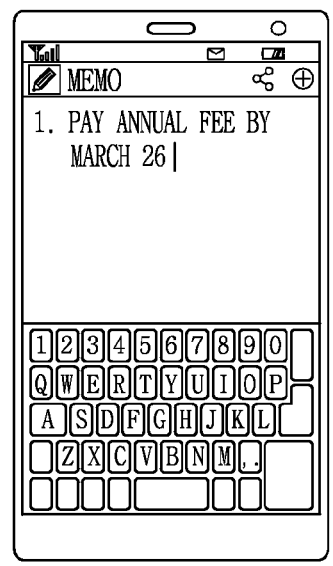
(c)

→ VIEW NEXT PAGE

→ VIEW PREVIOUS PAGE (a)  (b)

MOBILE TERMINAL PERFORMING A DIFFERENT OPERATION BASED ON A TYPE OF A TAP APPLIED TO A DISPLAY AND CONTROL METHOD THEREOF

CROSS REFERENCE TO RELATED APPLICATIONS

This application is a Continuation of co-pending application Ser. No. 14/389,990, filed on Oct. 1, 2014, which was filed as PCT International Application No. PCT/KR2013/011885 on Dec. 19, 2013, which claims the benefit under 35 U.S.C. §119(a) to Patent Application No. 10-2013-0093363, filed in Republic of Korea on Aug. 6, 2013, all of which are hereby expressly incorporated by reference into the present application.

TECHNICAL FIELD

The present invention relates to an mobile terminal and method for controlling functions of the mobile terminal in response to an external force applied to the mobile terminal.

BACKGROUND ART

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components which form the mobile terminal.

In addition, demand for a new user interface allowing functions of a terminal to be simply operated by a terminal or the vicinity of a terminal is increasing.

DISCLOSURE

Technical Problem

As aspect of the present invention provides a mobile terminal allowing a user to control the mobile terminal by simply tapping a body thereof or the vicinity thereof, and a control method thereof.

Technical Solution

To achieve these and other advantages and in accordance with the purpose of the present invention, as embodied and broadly described herein, the present invention provides in one aspect a mobile terminal including: a display unit; a touch sensor configured to sense a tap applied to the display unit; and a controller configured to control at least one of functions executable in the mobile terminal when a tap corresponding to a pre-set scheme is applied to the display unit, wherein the touch sensor is formed to sense the tap by using different schemes in an activated state or deactivated state of the display unit.

In the exemplary embodiment, the different schemes may be related to an activation period of the touch sensor, and the touch sensor may be activated at different periods according to whether the display unit is activated.

In the exemplary embodiment, in a state in which the display unit is deactivated, the touch sensor may be periodically activated to correspond to a pre-set particular period.

In the exemplary embodiment, when the display unit is in an activated state, the touch sensor may be continuously activated.

In the exemplary embodiment, when an applied touch is sensed by the touch sensor, power consumed by the touch sensor to sense the touch may vary according to whether the display unit is activated.

In the exemplary embodiment, the mobile terminal may further include a proximity sensor configured to sense an object positioned within a reference distance from the deactivated display unit, wherein whether to activate the touch sensor is determined according to whether the object is sensed by the proximity sensor.

In the exemplary embodiment, when the object is sensed by the proximity sensor, the touch sensor is deactivated, and when the object is not sensed, the touch sensor is periodically activated.

In the exemplary embodiment, in a state in which the display unit is deactivated, when taps successively applied to the display unit are sensed by the touch sensor, the at least one function may be controlled.

In the exemplary embodiment, the successively applied taps may include a first tap and a second tap applied within a pre-set period of time after the first tap is applied.

In the exemplary embodiment, when the second tap corresponds to pre-set invalidity conditions, although a tap corresponding to the pre-set scheme is sensed during a pre-set period of time after the second tap is sensed, the controller may limit controlling of the at least one function.

In the exemplary embodiment, when a tap corresponding to the pre-set conditions is applied in a state in which the display unit is in a deactivated state, information related to information displayed in a position to which the tap was applied in initial screen information displayed on the display unit may be displayed on the display unit when the display unit is switched from the deactivated state to an activated state.

In the exemplary embodiment, the initial screen information may correspond to a locked screen, and when the tap is applied to a first region of a display region of the display unit, time information may be displayed, and when the tap is applied to a second region different from the first region in the display region, a home screen page may be output.

In the exemplary embodiment, when the display unit is deactivated, the controller may control the at least one function in response to a tap applied to a pre-set particular region of the display unit.

In the exemplary embodiment, the touch sensor may be disposed to correspond to the display region of the display unit, and when the display unit is in a deactivated state, at least one region of the touch sensor may be deactivated.

Advantageous Effects

In the mobile terminal according to exemplary embodiments of the present disclosure, functions of the mobile terminal may be controlled in response to tapping applied to an object. Thus, a user may use a user interface of simply controlling functions of a mobile terminal although he or she does not operate the mobile terminal through a plurality of times of tapping applied to the mobile terminal.

Also, in the mobile terminal according to exemplary embodiments of the present disclosure, different functions may be controlled or different setting information may be changed according to a position to which tapping is applied. Thus, by applying tapping to various positions, the user may control various functions by simply tapping the mobile terminal.

Also, in the mobile terminal according to exemplary embodiments of the present disclosure, since tapping is sensed by using an accelerometer, tapping applied to a spot outside the terminal body, as well as tapping applied to the terminal body, may be sensed. Thus, when the terminal is away or when the user wears gloves so he or she cannot apply a touch, the user may control various functions through tapping.

Also, in the mobile terminal according to exemplary embodiments of the present disclosure, since the touch sensor is periodically activated in a state in which the display unit is deactivated, tapping applied to the display unit may be accurately sensed by using the touch sensor. Also, since the touch sensor is periodically activated, efficiency of power usage may be increased.

Also, although other sensing units are deactivated, an accelerometer of the mobile terminal according to exemplary embodiments of the present disclosure is continuously activated (always-on) to sense tapping applied to the mobile terminal until when a battery is discharged. In the mobile terminal according to exemplary embodiments of the present disclosure, when a first tap is sensed, various sensors such as the touch sensor, or the like, may be activated. Thus, in the mobile terminal, a second tap may be sensed by using various sensors together with the accelerometer, malfunction may be prevented and power consumption may be minimized.

DESCRIPTION OF DRAWINGS

FIG. 1 is a block diagram of a mobile terminal according to an embodiment of the present invention.

FIGS. 7A through 7E are conceptual views illustrating the control method of FIG. 4.

BEST MODES

Figure 2A:
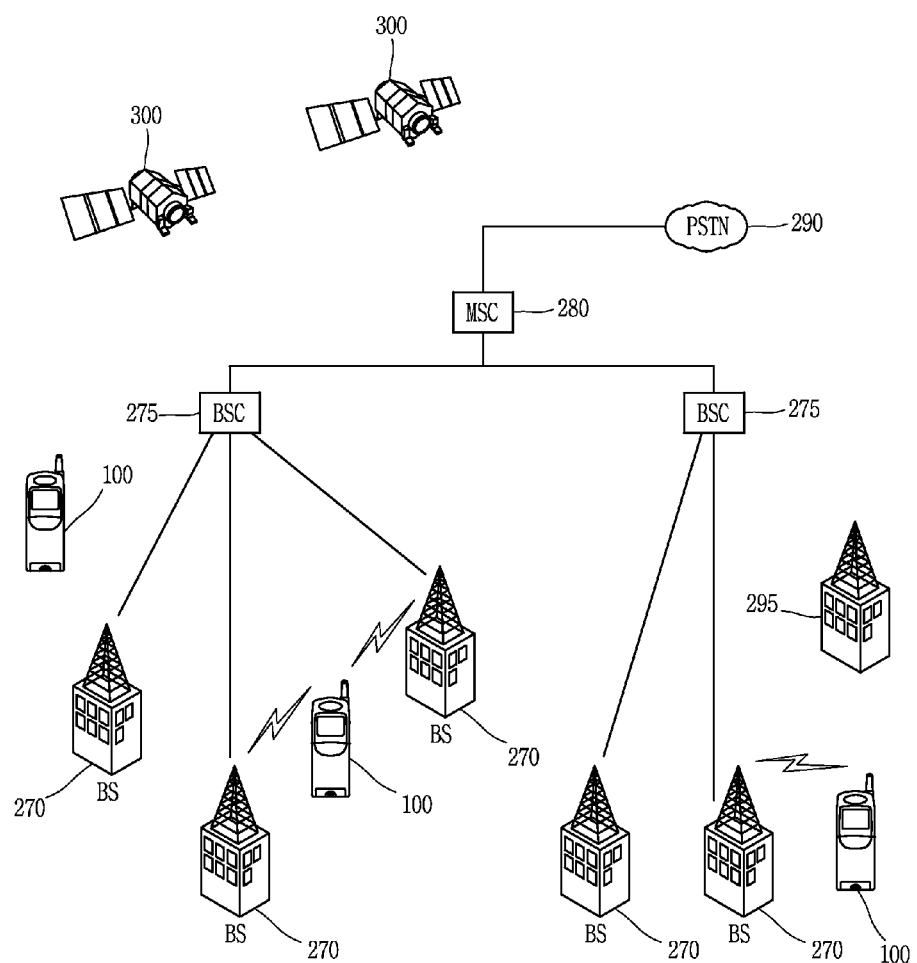
FIGS. 2A and 2B are conceptual views of communication systems in which the mobile terminal according to an embodiment of the present invention is operable.

Description will now be given in detail of the exemplary embodiments, with reference to the accompanying drawings. For the sake of brief description with reference to the drawings, the same or equivalent components will be provided with the same reference numbers, and description thereof will not be repeated. The suffixes attached to components of the wireless speaker, such as 'module' and 'unit or portion' were used for facilitation of the detailed description of the present disclosure. Therefore, the suffixes do not have different meanings from each other.

The mobile terminal according to the present disclosure may include a portable phone, a smart phone, a laptop computer, a tablet computer, a digital broadcasting terminal, Personal Digital Assistants (PDA), Portable Multimedia Player (PMP), a navigation system, a slate PC, a tablet PC, an ultrabook, etc. The present disclosure discloses a mobile terminal, but it would be easily understood by those skilled in the art that the configuration according to the embodiment disclosed herein may be applicable to a stationary terminal, such as a digital TV, a desktop computer, and the like, excluding a case where it is applicable to only the mobile terminal.

FIG. 1 is a block diagram of a mobile terminal 100 according to one embodiment of the present disclosure.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 153, an alarm unit 154, a haptic module 155, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

An accelerometer 145 may sense a movement of the terminal body. For example, the accelerometer may sense a movement of the terminal body in a space based on an x axis, a y axis, and a z axis. Also, the accelerometer 145 may measure a movement speed, an angular speed, and the like, as well as dynamic force such as acceleration of the terminal body, vibration of the terminal body, an impact applied to the terminal body, and the like.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm unit 154 outputs signals notifying occurrence of events from the mobile terminal 100. The events occurring from the mobile terminal 100 may include call received, message received, key signal input, touch input, and so on. The alarm unit 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm unit 154.

The haptic module 155 generates various tactile effects which a user can feel. A representative example of the tactile effects generated by the haptic module 155 includes vibration. Vibration generated by the haptic module 155 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a as computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Figure 2B:
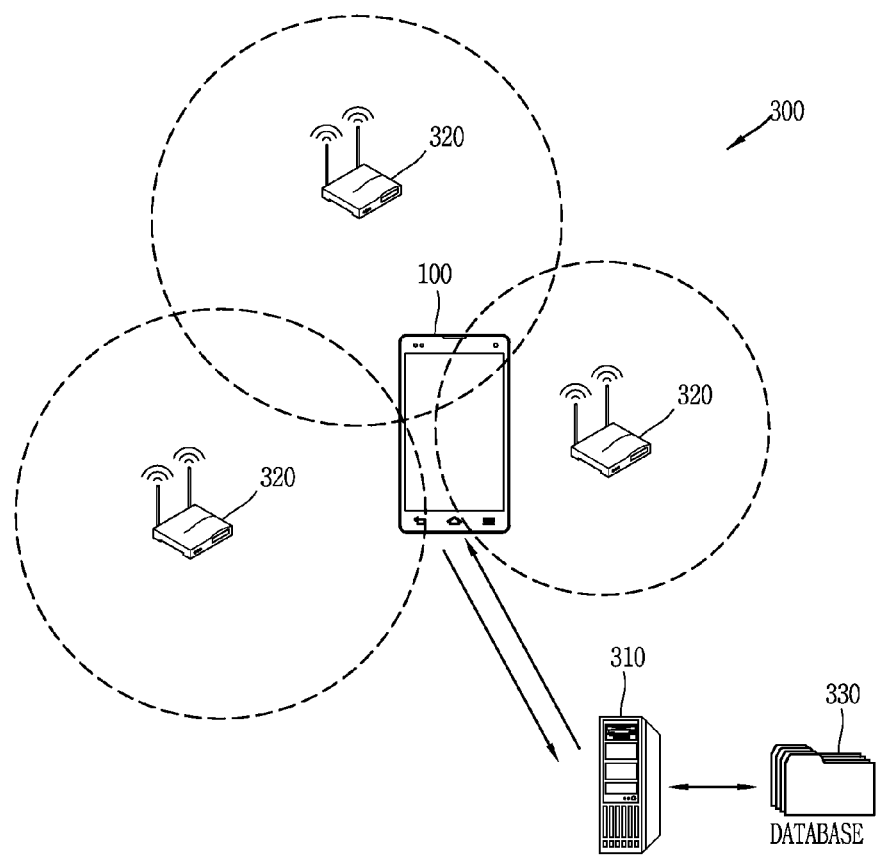

Next, a communication system that can be implemented through the mobile terminal 100 according to the present disclosure will be described. FIGS. 2A and 2B are conceptual views illustrating a communication system in which a mobile terminal 100 according to the present disclosure is operable.

FIGS. 2A and 2B are conceptual views of a communication system where the mobile terminal 100 according to the present invention can operate.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
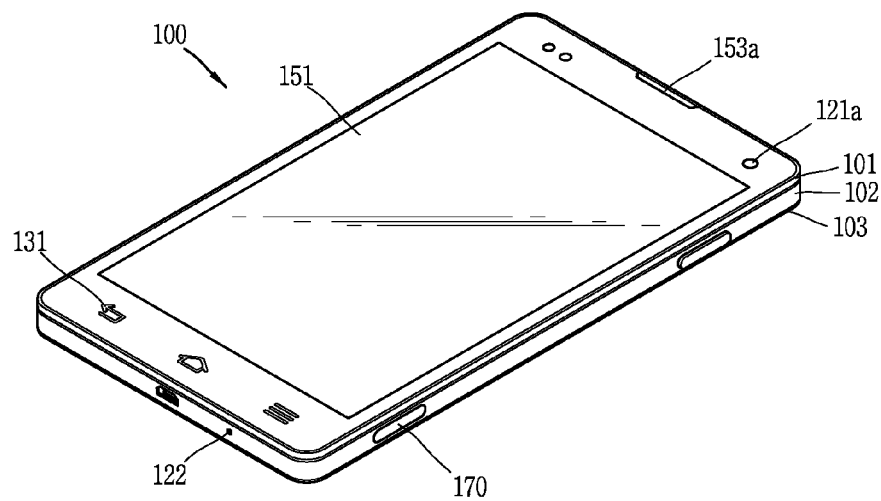
FIG. 3A is a front perspective view of the mobile terminal related to the present invention.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
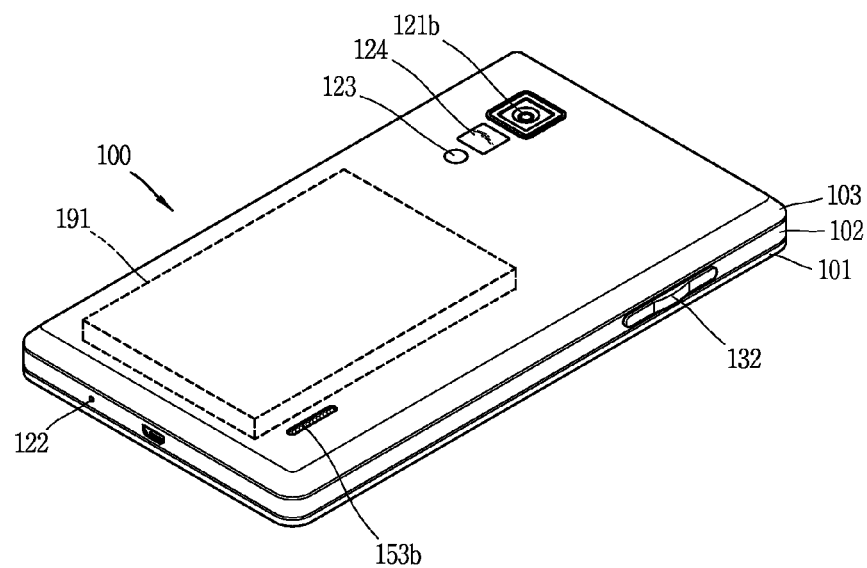
FIG. 3B is a rear perspective view of the mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Also, functions of the mobile terminal according to an exemplary embodiment of the present disclosure including at least one or more of the components as discussed above may be controlled in response to a tap (or a tap gesture) applied to the terminal body of the mobile terminal or applied to a spot outside the terminal body. Namely, in the mobile terminal according to an exemplary embodiment of the present disclosure, in response to the tap, a function or application being executed in the mobile terminal may be controlled. Also, in the exemplary embodiment of the present disclosure, a function, which may be executable in the mobile terminal although not currently being executed in the mobile terminal, may be executed. Thus, the user may control at least one of functions executable in the mobile terminal by a simple gesture of tapping an object.

Hereinafter, a mobile terminal capable of providing a new user interface based on a tap applied to an object and a control method thereof will be described in detail with reference to the accompanying drawings.

Figure 4:
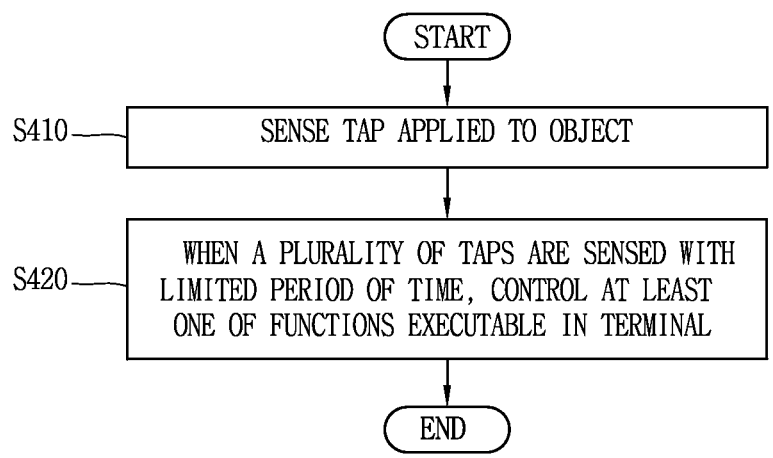
FIG. 4 is a flow chart illustrating a control method of a mobile terminal according to an exemplary embodiment of the present disclosure.

FIG. 4 is a flow chart illustrating a control method of a mobile terminal according to an exemplary embodiment of the present disclosure.

Referring to FIG. 4, the mobile terminal according to the exemplary embodiment of the present disclosure senses a tap applied to an object in step S410.

Here, tap or tap gesture may denote a gesture hitting the body 100 of the mobile terminal or an object. More specifically, tap may be understood as an operation of slightly hitting the mobile terminal body 100 or object with a tap object such as a finger and the like or an operation of allowing a tap object to be slightly brought into contact with the mobile terminal body 100 or object.

On the other hand, the tap object applying such a tap may be a thing capable of applying an external force to the mobile terminal body 100 or object, for example, finger (part with a fingerprint), stylus pen, pen, pointer, first (finger joint) and the like. On the other hand, the tap object may not be necessarily limited to a thing capable of applying a touch input to a mobile terminal according to the present disclosure, and the type thereof does not matter if it is a thing capable of applying an external force to the mobile terminal body 100 or object.

Meanwhile, an object to which a tap is applied may include at least one of the terminal body and a position out of the body. In other words, the input region of the mobile terminal may be extended to an outside of the terminal body. Accordingly, the position capable of sensing the tap at a position out of the terminal body becomes a virtual input region.

Furthermore, the virtual input region may vary in the area according to a location or object on which the terminal is placed or the strength of a tap. For example, when the terminal is placed on a table, the movement of the terminal may be generated if the user hits the table, thereby sensing the tap therethrough. As a result, the virtual input region is increased as increasing the strength of the hitting. For another example, when the user holds the terminal body, the virtual input region may disappear.

On the other hand, during the process of sensing a tap, it may be determined that "knockknock (or knock-on)" for the purpose of controlling the mobile terminal is sensed only when at least two or more taps are applied within a limited period of time. For example, when a tap is applied once to the display unit 151 by a touch subject capable of applying a touch to the display unit 151, the controller 180 may recognize the one tap as a touch input. Namely, in this case, the controller may control a function (for example, a function of selecting an icon output to a spot to which the touch input was applied) according to a touch input corresponding to the one tap.

Accordingly, the sensing unit 140 may generate a control signal for controlling one or more functions only when at least two or more (or plurality of) taps are consecutively applied within a limited period of time.

In other words, consecutively sensing at least two or more taps within a limited period of time may be referred to as "knockknock (or knock-on)". For example, when a second tap is sensed within a limited period of time from a time point at which a first tap is sensed, it may be determined that "knockknock" is sensed. Accordingly, hereinafter, sensing "knockknock" may denote that hitting an object on the terminal body or at a position out of the body is substantially sensed a plural number of times.

Meanwhile, regarding "knockknock", after a first tap tapping the terminal body or a spot outside the terminal body by a first reference number of times or more is sensed, a second tap tapping the terminal body or a spot outside the terminal body by a second reference number of times or more is sensed.

In this case, in response to the sensed first tap, the sensing unit may switch to a ready state (or an activated state), and when a second tap is applied, the sensing unit 140 may generate a control signal for controlling the terminal. Namely, the user may first apply the first tap to deliver information indicating that the mobile terminal will be controlled, to the mobile terminal.

Here, the first reference number of times and the second reference number of times may be equal or different. For example, the first reference number of times may be three times and the second reference number of times may be two times. In another example, the first reference number of times and the second reference number of times may be two or more times.

In addition, the first and second taps of "knockknock" may be input in various patterns. For example, an operation of lightly tapping an object may correspond to a dot of Morse code, and an operation of not releasing a contact during a predetermined period of time in an object-contacted state may correspond to a dash (line) of the Morse code. For example "knockknock", "knock-knock", "knockknock-" may be a case in which two taps are applied but may be tap gestures generated in different patterns.

However, for the purposes of description, in the following description, the mobile terminal according to an exemplary embodiment of the present disclosure will be described by using an example in which first and second reference number of times are one time and have the same pattern.

In addition, besides the case in which the first and second taps are sensed within the limited period of time, the sensing unit 145 may determine that "knockknock" is sensed when the first and second taps are applied within a predetermined region. For example, "knockknock" may refer to a plurality of times of tapping successively sensed within a predetermined region within the limited period of time.

Meanwhile, here, the limited period of time may be a very short time. For example, the limited period of time may be a time within 300 ms to 2 s. The predetermined region may be a spot to which the first and second taps were applied or a narrow region that may be considered as the same spot.

To this end, when the first tap applied to the mobile terminal body or an object is sensed by the sensing unit 140, the sensing unit 140 may calculate a predetermined region from the spot in which the first tap was sensed. After the first tap, when a second tap applied to the predetermined region is sensed within a limited period of time after the first tap was sensed, the sensing unit 140 may determined that "knockknock" has been sensed.

Meanwhile, the foregoing reference limited period of time and the predetermined region may be variously modified according to an embodiment.

In this manner, when "knockknock" applied to the terminal body or an object positioned at a spot outside the mobile terminal is sensed, the sensing unit 140 generates a control signal. The generated control signal is delivered to the controller 180.

Thereafter, when a plurality of times of taps ("knockknock") are sensed within the limited period of time, at least one of the functions executable in the terminal is controlled in step S420. Namely, the controller 180 may control at least one of functions executable in the terminal in response to the control signal.

Here, the functions executable in the terminal may refer to any type of function that may be executed or driven in the mobile terminal. For example, one of executable functions may be an application installed in the mobile terminal. For example, executing of a 'certain function' may refer to executing or driving a certain application.

In another example, the function executable in the mobile terminal may be a function of receiving an event. Here, the received event may include a message reception event, a call reception event, or the like. Meanwhile, the event may be an event occurring in an application installed in the mobile terminal.

In another example, the function executable in the mobile terminal may be a function required for basic driving of the mobile terminal. For example, a function required for basic driving may be a function of turning on or off lighting provided in the display unit 151, a function of switching the mobile terminal from an unlocked state to a locked state or from a locked state to an unlocked state, a function of establishing a communication network, a function of changing configuration information of the mobile terminal, and the like.

In this manner, according to an exemplary embodiment of the present disclosure, the controller 180 may control at least one of functions executable in the mobile terminal in response to a control signal.

Meanwhile, the control signal may vary depending on characteristics of "knockknock". Here, the characteristics of "knockknock" may be related to at least one of the number of times of applying taps, a position to which a tap is applied, a speed of a tap, strength of a tap, a pattern or a tap, and a region of a tap. For example, in a case in which taps are applied twice, the sensing unit 140 may generate a first control signal, and when taps are applied three times, the sensing unit 140 may generate a second signal. Also, the controller 810 may control functions corresponding to the first and second control signals.

Meanwhile, in response to a control signal, the controller 180 may change configuration information related to a currently driven function or a function corresponding to screen information output to the display unit 151 among currently driven functions. In this case, the controller 180 may output guide information regarding controllable configuration information to the display unit 151 according to a position to which "knockknock" is applied.

Meanwhile, here, "a function controlled in response to the control signal generated by "knockknock" may vary according to a current state of the mobile terminal or characteristics of "knockknock".

First, a state of the mobile terminal will be described in detail. When "knockknock" is sensed, the controller 180 may perform different controlling according to a state of the mobile terminal, namely, according to a function currently driven in the mobile terminal, a type of screen information displayed on the display unit 151, an application corresponding to screen information output to the display unit 151, an ON/OFF state of lighting of the display unit, a locked/unlocked state of the mobile terminal, and the like.

In detail, although the same "knockknock" is sensed, in a state in which lighting of the display unit 15 is in an 'OFF' state, the controller 180 may execute a 'voice recognition function', and in a state in which lighting of the display unit 151 is in an ON state, the controller 180 may perform controlling on an application related to the currently output screen information, or when the currently output screen information is a locked screen, the controller 180 may release the locked state and output a home screen page to the display unit 151.

Also, a function executable in response to a tap applied to the terminal body or a spot (or an object on which the terminal body is placed) outside of the terminal body may be changing configuration of a function being currently driven in the mobile terminal, changing a configuration of an application related to screen information output to the mobile terminal, or changing a configuration of a function corresponding to screen information output to the mobile terminal.

The characteristics of "knockknock" will be described. The sensing unit 140 may generate different control signals based on a position to which a tap is applied, a component (a microphone, a speaker, or the like) disposed in a position to which a tap is applied, strength of a tap, a speed of a tap, an area of a tap, a pattern of a tap, and the like. Namely, the controller 180 may control different functions according to the characteristics of "knockknock". Alternatively, the control signal may include information regarding the characteristics of "knockknock" and the controller 180 may control different functions by using the information included in the control signal.

Hereinafter, a method for sensing "knockknock" will be described in detail, and a method of controlling the mobile terminal according to the control method described above with reference to FIG. 4 will be described in detail along with the accompanying drawings.

Figure 5:
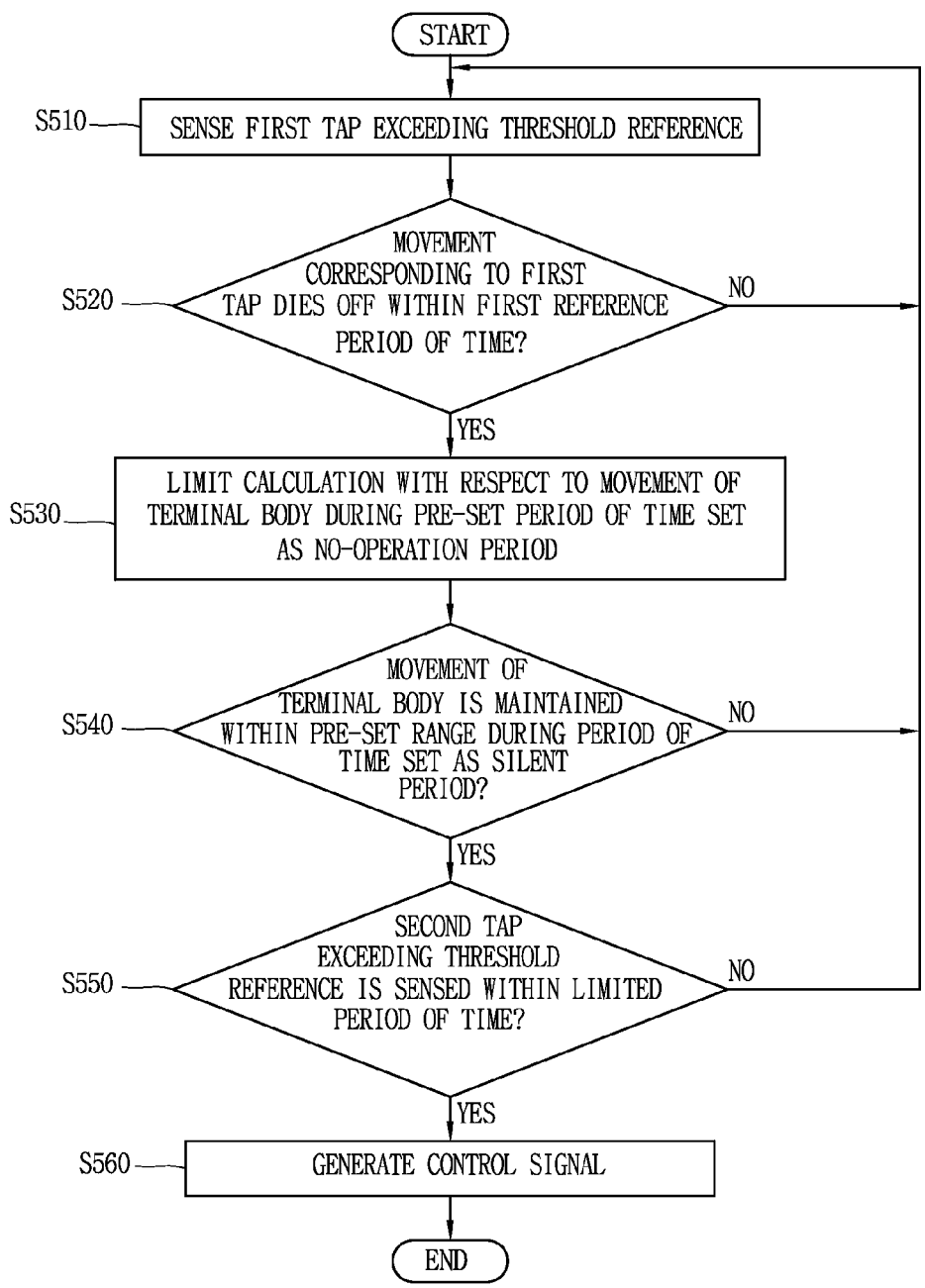
FIG. 5 is a flow chart specifically illustrating a method of using an accelerometer in the control method illustrated in FIG. 4.
Figure 6:
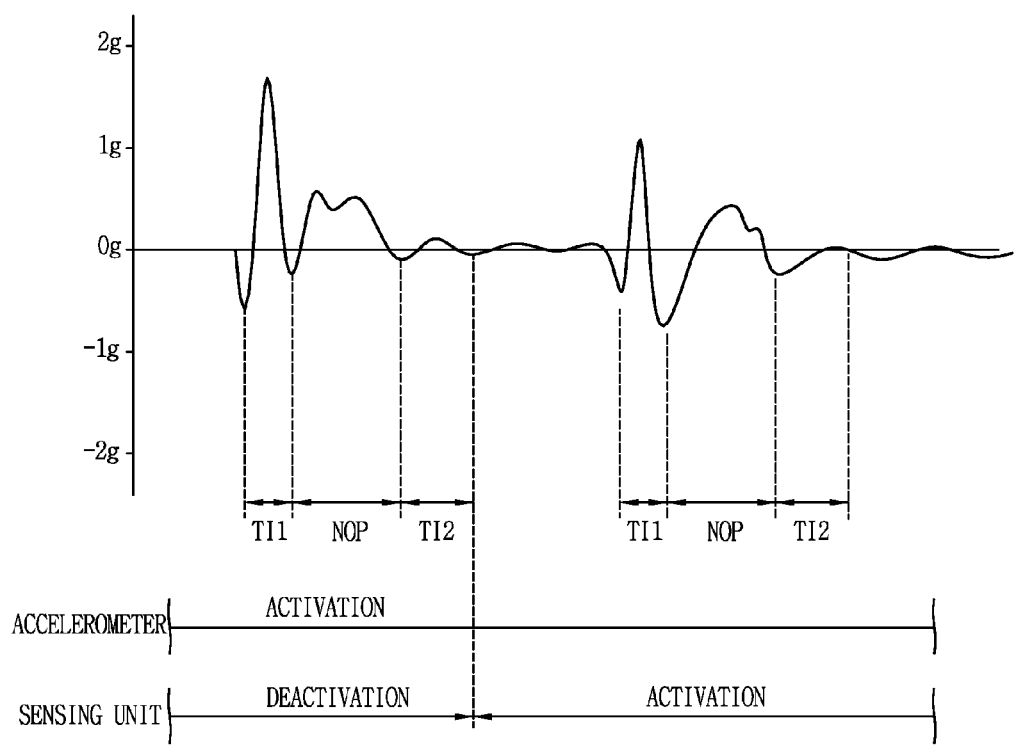
FIG. 6 is a view illustrating a method of sensing tapping by the accelerometer according to the control method illustrated in FIG. 5.

First, a method of sensing "knockknock' will be described. FIG. 5 is a flow chart specifically illustrating a method of using an accelerometer in the control method illustrated in FIG. 4. FIG. 6 is a view illustrating a method of sensing tapping by the accelerometer according to the control method illustrated in FIG. 5.

In the mobile terminal according to an exemplary embodiment of present disclosure, the accelerometer 145 (please refer to FIG. 1) may sense a movement of the terminal body based on at least one of an x axis, a y axis, and a z axis. Also, the accelerometer 145 may generate an acceleration signal corresponding to the movement of the terminal body. For example, referring to FIG. 6, an acceleration signal of the x axis according to a movement of the terminal body is illustrated as an embodiment.

Referring back to FIG. 5, the accelerometer 145 senses a first tap exceeding a threshold reference in step S510. The threshold reference is provided to prevent malfunction of the accelerometer 145, and is used to determine whether a tap for generating a control signal has been sensed.

In this case, the accelerometer 145 may compare a difference value between nth generated acceleration signal and (n−1)th generated acceleration signal with the threshold reference to determine whether a movement of the terminal body has been generated by the first tap. When the difference between the acceleration signals is greater than the threshold reference, the accelerometer 145 may determine that the first tap has been applied.

Thereafter, it is determined whether a movement of the terminal body corresponding to the first tap dies off within a first reference period of time TI1 in step S520. For example, when the mobile terminal falls from the sky to the ground, a movement exceeding the threshold reference may be continuously sensed. In this case, it cannot be considered that the first tap has been sensed, so the movement corresponding to the first tap does not die off within the first reference period of time TI1, the process is returned to a previous step.

Thereafter, calculation of the movement of the terminal body during a period of time set as a no-operation period (NOP) is limited in step S530. For example, in a case in which tapping is applied to an object, a movement exceeding the threshold reference is sensed at the point in time when the tapping is applied, and thereafter, aftershock of the tapping may remain so the terminal body may be moved. In order to prevent malfunction of the mobile terminal due to the aftershock, the accelerometer 145 may disregard an acceleration signal generated during the period of time set as the NOP.

Next, it is determined whether the movement of the terminal body is maintained within a pre-set range during a period of time TI2 set as a silent period in step S540.

For example, in a case in which the user waves with the terminal body held in his or her hand up and down, a movement exceeding the threshold reference may be continuously sensed. In a case in which a movement exceeding the threshold reference is continuously sensed even after the period of time set as the NOP has lapsed, it may be considered that a tap has been sensed. Thus, after aftershock by the first tap dies off, a movement of the mobile terminal should not be sensed during the predetermined period of time TI2.

Namely, after the period of time set as the NOP has lapsed, if a movement of the terminal body is not maintained within a pre-set range during the period of time TI2 set as the silent period, the process is returned to the first step. In this case, the pre-set range may refer to a range within which the mobile terminal is not moved.

Thereafter, whether a second tap exceeding a threshold reference is sensed within the limited period of time is determined in step S550. Namely, when a duration from a point in time at which a first tap is sensed to a point in time at which a second tap is sensed is within the limited period of time, it may be considered that "knockknock" has been sensed. If the second tap is not sensed within the limited period of time, the process is returned to the first step.

When "knockknock" is sensed, a control signal is generated in step S560. The control signal may vary according to peaks of the first and second taps corresponding to the characteristics of "knockknock", a duration from a point in time at which the first tap is sensed to a point in time at which the second tap is sensed, and target spots to which the first and second taps were applied, or may include information regarding the characteristics of "knockknock". The controller 180 may control at least one of functions controllable in the terminal by using the control signal.

Meanwhile, referring to FIG. 6, in the mobile terminal according to the exemplary embodiment of the present disclosure, the accelerometer 145 may be continuously in an activated state (always-on) while power is being supplied to the controller. Namely, even when a sleep mode in which components excluding an essential component for minimizing battery consumption are deactivated is executed, unless the battery is dead, the accelerometer 145 may constantly sense a movement of the terminal body and, as "knockknock" is sensed, the accelerometer 145 may generate a control signal.

Alternately, sensors other than the accelerometer 145 may be deactivated in the sleep mode. In the deactivated state, when a first tap is sensed by the accelerometer 145, the other sensors are activated to sense the second tap. The other sensors may include a touch sensor, a microphone sensor, a proximity sensor, an RGB sensor, a pressure sensor, and the like, and may be used to distinguish the characteristics (strength of a tap, a target spot, a time interval between first and second taps, a subject of a tap, and the like) of "knockknock".

For example, the touch sensor may be disposed in the terminal body to sense the second tap by using a touch applied to the terminal body. Also, the touch sensor may calculate a position to which the second tap is applied, and a second tap object (for example, a finger, a finger nail, a palm, and the like) may be distinguished by using the area with which the second tap is touched.

In another example, the microphone sensor may sense the second tap by using a sound generated in the vicinity of the terminal body. Also, a sound has unique frequency characteristics, and thus, the second tap object (for example, a finger, a finger nail, a palm, a pen, and the like) and patterns of the first and second taps may be distinguished by using frequency characteristics of received sound information.

In another example, the proximity sensor may sense the second tap by using the presence and absence of an object positioned in the vicinity of the terminal body. When the proximity sensor detects an object adjacent to a front side of the terminal body, the controller 180 may reject a control signal generated by the accelerometer. This is because the mobile terminal 100 may malfunction due to waving of a bag.

In another example, the RGB sensor may sense a color with respect to a subject of the second tap. The RGB sensor may discern a type of the subject by using the sensed color.

In another example, the pressure sensor may sense a second tap by using pressure applied to the terminal body and may calculate strength of pressure generated by the second tap.

In another example, a piezo sensor (or an impact sensor) using properties that electricity is generated from a surface of a crystal when pressure is applied in a particular direction may sense the second tap. Compared with an accelerometer that senses a movement corresponding to hundreds of hz, the piezo sensor may sense a movement corresponding to a few khz, so it may more accurately sense a movement (or impact) of the mobile terminal.

In addition, a tap object and pattern may be recognized by using the piezo sensor. Since different physical patterns are generated according to a tap object applying impact to the terminal, a tap object and a pattern of a tap may be recognized by using physical patterns obtained experimentally. The experimentally obtained physical pattern may be created in a process of releasing in a factory and stored in the memory 160, and may be periodically updated or changed by a user.

Meanwhile, when a second tap is not sensed within the limited period of time, sensors, other than the accelerometer, are deactivated in order to prevent battery consumption.

Here, in a case in which both the accelerometer and the other remaining sensors sense the second tap, controlling may be performed by "knockknock". Since various sensors are used, malfunction of the mobile terminal may be prevented, and since the other remaining sensors, excluding the accelerometer, are activated only during the limited period of time after the first tap is sensed, power may be effectively used.

Meanwhile, a tap is applied by a tap object, a signal exceeding the threshold reference only in one of the three axes of the accelerometer is generated. Meanwhile, when the mobile terminal falls to a floor or is placed on an object, a movement similar to "knockknock" may be sensed. In this case, since signals exceeding the threshold reference are generated from in at least two axes, when a movement exceeding the threshold reference in another axis is sensed in a state in which a movement exceeding the threshold reference in one axis is sensed, the accelerometer may reject the corresponding movement.

Besides, various other methods for preventing malfunction due to "knockknock" may be applied to the mobile terminal.

Meanwhile, the mobile terminal according to an exemplary embodiment of the present disclosure may have a micro-controller unit (MCU) for controlling sensors. The MCU may serve as a hub of sensors, collect signals from sensors, and determine whether "knockknock" has been generated. Namely, the MCU may generate a control signal by synthesizing signals from the sensors.

The MCU, not an application processor (AP) as a main processor of the mobile terminal, may collect signals from the sensors and generate a control signal. Namely, even when the AP is driven in a low power mode according to execution of a sleep mode, the MCU may maintain an activated state (always-on) state while power is being supplied. When "knockknock" is sensed, the MCU activates the AP by using the control signal, so current consumption is significantly reduced.

Also, the MCU may activate other sensors to sense a second tap, in response to a first tap sensed by the accelerometer. Since the sensors are controlled by the MCU and the MCU determines whether "knockknock" has been generated by using a plurality of sensors, a generation of malfunction may be prevented in advance.

Besides, the MCU may have an algorithm, or the like, for recognizing the characteristics of "knockknock" and determine characteristics of "knockknock" by collectively using signals from the sensor.

Hereinafter, a method for controlling a mobile terminal according to the control method described above with reference to FIG. 4 will be described. FIGS. 7A through 7E are conceptual views illustrating the control method of FIG. 4. The mobile terminal controlling a function in response to "knockknock" in a state in which the display unit 151 is in a deactivated state (or in an OFF state) is illustrated.

In the mobile terminal according to the exemplary embodiment of the present disclosure, even when the display unit 151 is in a deactivated state (or in an OFF state), tapping applied to the body of the mobile terminal or tapping applied to a spot outside of the terminal body may be sensed. In the case in which the body of the mobile terminal or a spot outside of the terminal body is tapped in the state in which the display unit 151 is deactivated, the controller 180 may switch the display unit 151 into an activated state. Namely, in response to sensing of "knockknock (T)", the controller 180 may turn on lighting of the display unit 151. In this case, if the mobile terminal is in a locked state, a lock screen may be displayed on the display unit 151.

Also, as the display unit 151 is activated, various types of information may be output. The controller 180 may output different information according to a position of the display unit 151 to which tapping is applied. For example, as illustrated in (a) of FIG. 7A, when "knockknock" T is applied to a region of the locked screen (the region may differ according to mobile terminals) in which time information is displayed, the controller 180 may turn of lighting of the display unit 151, and as illustrated in (b) of FIG. 7A, the controller 810 may output screen information 701 specified for the time information. The screen information may include various types of time information, such as current time information, world time information, and the like. Also, in a state in which the screen information 401 is output, the mobile terminal may be in a locked state. Thus, in this case, the user may switch the locked state into an unlocked state by applying a touch, or the like, to the display unit 151.

Although not shown, when knockknock T is applied to a region corresponding to a position where a home button is disposed, the controller 180 may immediately switch the locked state into an unlocked state and output a home screen page. Meanwhile, when the mobile terminal is switched to the unlocked state, a first output screen may not a home screen page. For example, when the mobile terminal is switched to the unlocked state, a screen first output to the display unit 151 may be screen information which has been lately output to the display unit 151 before the locked state was executed.

Meanwhile, regardless of a function being executed in the mobile terminal, when the home button is pressed (or selected), the home screen page may be output to the display unit 151. Namely, when the home button is pressed or touched, the controller 180 may output the home screen page to the output unit 151. Meanwhile, although the home button is pressed, if the mobile terminal is in a locked state, the home screen page may not be output. Also, such a home button may be implemented as a hardware key or a virtual key.

Meanwhile, without being limited to the embodiment in which the position where the home button is disposed is tapped, when "knockknock" T is applied to a region in which a key having a different function (for example, a volume key, a power key, or the like) is disposed, the controller 180 may control a function corresponding to the key having the corresponding function.

Also, in the mobile terminal according to an exemplary embodiment of the present disclosure, as illustrated in (a) of FIG. 7B, while a certain function (for example, a memo function application) is being executed, in a case in which a control command is not applied to the mobile terminal during a predetermined period of time, as illustrated in (b) of FIG. 7B, lighting of the display unit 151 may be turned off (this case may be expressed as 'Time out", which means that lighting of the display unit 151 is turned off). In this case, as illustrated in (c) of FIG. 7B, when "knockknock" T is applied, the controller 180 may output screen information which has been output before the lighting is turned off.

Meanwhile, as illustrated in (a) of FIG. 7B, when a certain function has been activated, for example, a character input function in the memo function application has been activated, in a case in which the screen information has been output again through "knockknock" T, as illustrated in (c) of FIG. 7B, the controller 180 may activate the certain function (for example, the character input function) in the same manner.

In another example, in a case in which a particular function is executed in a state in which lighting of the display unit 151 is turned off (this may be a locked state), the controller 180 may control the particular function in response to the "knockknock" T sensed in the state in which the lighting of the display unit 151 is turned off.

In this manner, in the mobile terminal according to an exemplary embodiment of the present disclosure, different controlling may be performed according to "knockknock" T applied to different positions. Also, the different positions may be positions that may be generally or conceptually recognized by the user, and accordingly, the controller 810 may provide more familiar user experience (UX) to the user.

Also, when a first tap is sensed, the controller 180 may output guide information regarding a function to be controlled as a second tap is applied. Also, such guide information may be information guiding a position to which the second tap is to be applied or information regarding a function to be controlled according to the second tap. Also, such guide information may be output through at least one of visual, audible, and tactile method.

Meanwhile, the controller 180 may control only the music play function, while continuously deactivating lighting of the display unit 151. In the case in which a particular function is being executed in a state in which the display unit is deactivated, the controller 180 may control the particular function, while maintaining the deactivated state of the display unit in response to a sensed tap. Thus, power consumed to activate lighting of the display unit 15 may be reduced.

Figure 7A:
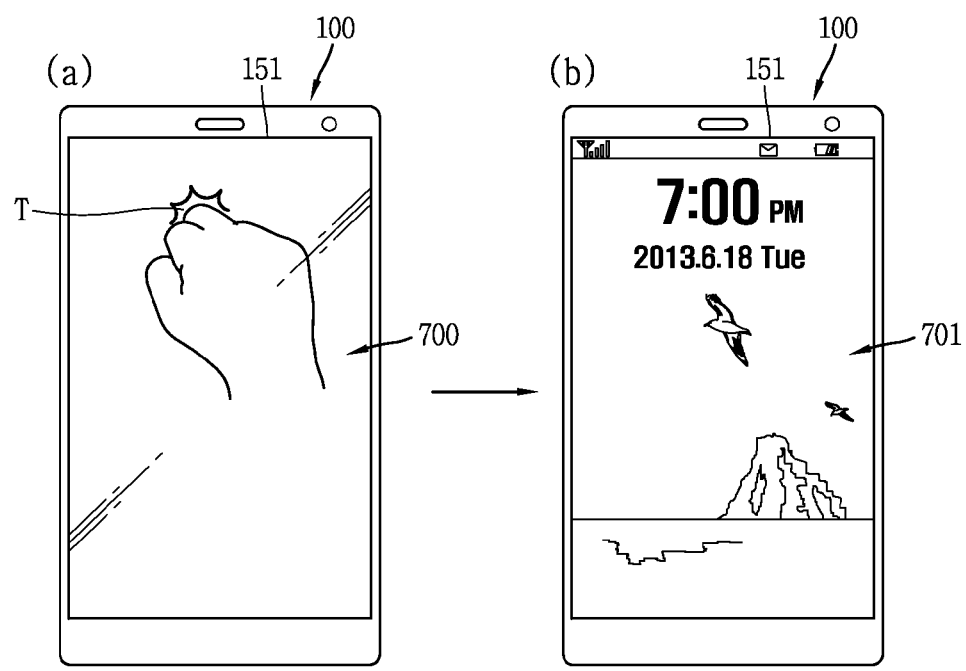
Figure 7C:
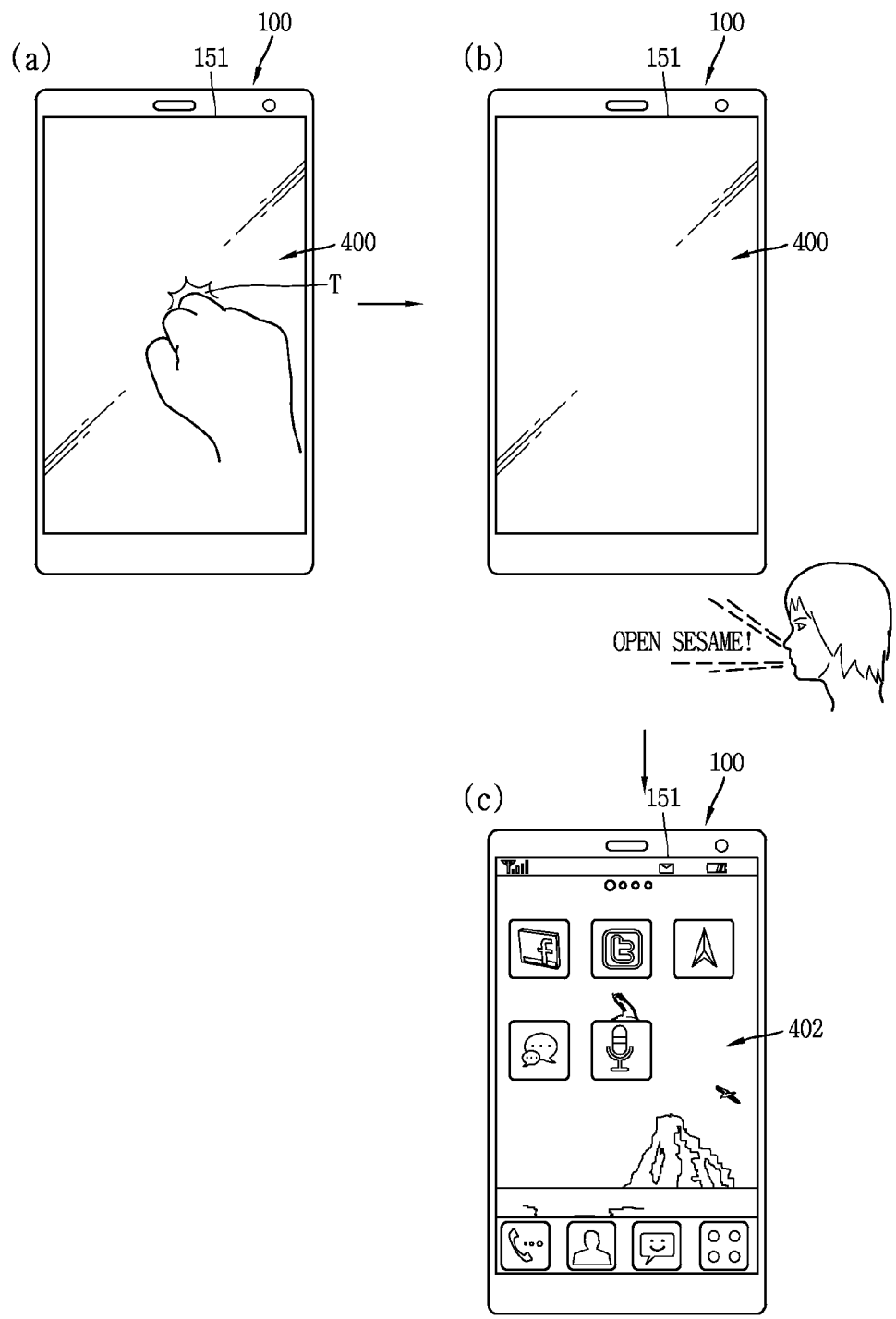

Meanwhile, in the mobile terminal according to an exemplary embodiment of the present disclosure, as illustrated in (a) of FIG. 7C, when "knockknock" T is applied in the state in which the display unit 151 is in the deactivated state, as illustrated in (b) of FIG. 7C, the controller 180 may activate a voice recognition function. In response to a voice command input from the user, the controller 180 may activate, execute, or perform a function related to the corresponding voice command.

For example, as illustrated in (b) of FIG. 7C, when a voice command (for example, "Open, Sesame!") for releasing the locked state is recognized, as illustrated in (c) of FIG. 7C, the controller 180 may switch the locked into an unlocked state and turn on lighting of the display unit 151.

Meanwhile, the controller 180 may output notification information indicating that the voice recognition function has been activated, by using at least one of visual, tactile, and audible method. Meanwhile, when visual notification information is output, the controller 180 may activate only a portion of the display unit 151 and output the notification information.

Meanwhile, in a case in which characteristics of "knockknock" T correspond to pre-set conditions, the controller 180 may perform a function previously matched to the applied "knockknock" T. For example, when "knockknock" having first characteristics is sensed, the controller 180 may perform a first function matched thereto, and when "knockknock" having second characteristics different from the first characteristics is sensed, the controller 180 may perform a second function matched thereto. Also, the first and second functions may be performed only when a state of the mobile terminal meets the particular conditions. For example, in a case in which the first function is set to be performed only when a tap having the first characteristics is sensed in the locked state, although "knockknock" having the first characteristics is sensed in an unlocked state, the controller 180 may not perform the first function.

Figure 7D:
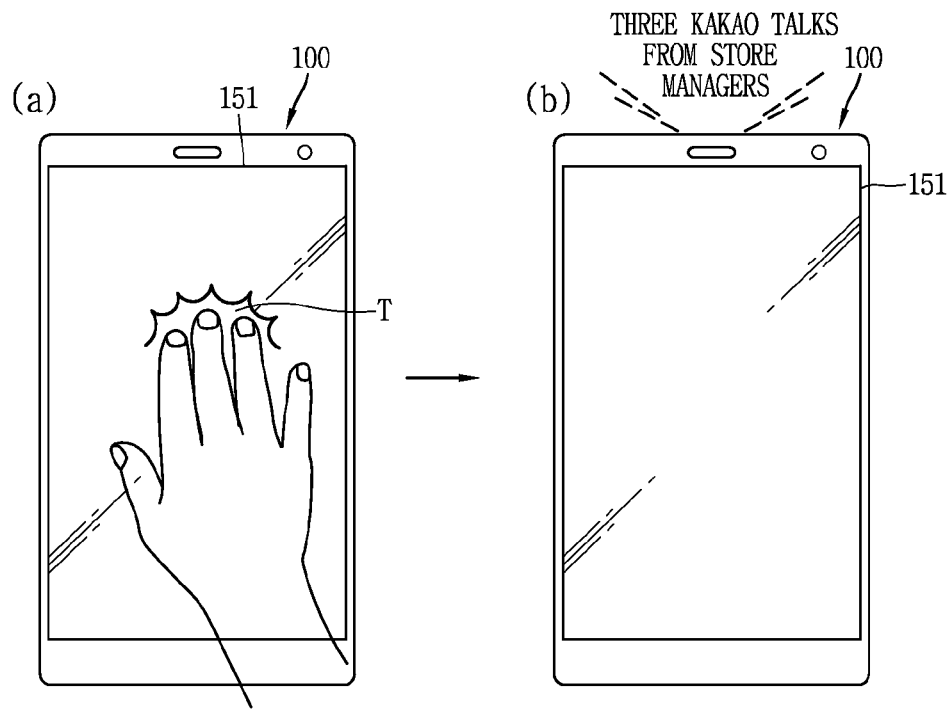

For example, "knockknock" T having the first characteristics may be "knockknock" T with respect to a predetermined area or greater, and as illustrated in FIG. 7D, when "knockknock" T having the predetermined area or greater is sensed on the display unit 151, the controller 180 may perform the function matched to the first characteristics. Here, the function matched to the first characteristics may be a function of outputting context information by voice. Thus, in response to the "knockknock" T sensed in the predetermined area or greater, the controller 180 may output situation information (for example, event reception information, current time information, weather information, state information (battery, communication state, position, and the like) of the mobile terminal). Meanwhile, although "knockknock" T applied to the predetermined area or greater is sensed, if a state of the mobile terminal does not meet pre-set conditions (for example, a condition in which lighting of the mobile terminal is in an OFF state or the mobile terminal is in a locked state), the function matched to the first characteristics may not be performed.

Figure 7E:
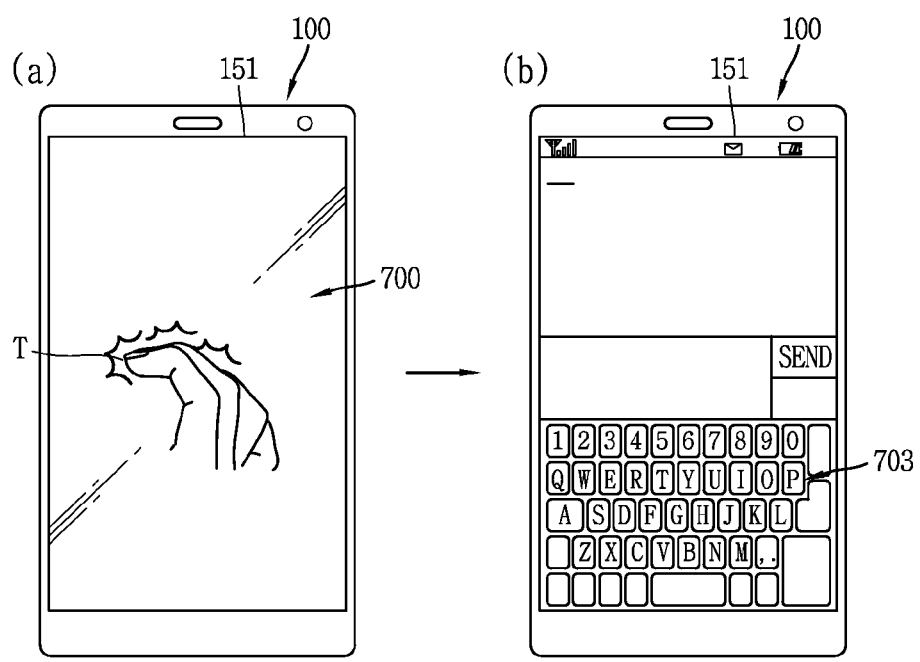

Also, in another example, as illustrated in (a) of FIG. 7E, when "knockknock" T (for example, "knockknock" sequentially applied to different regions) having the second characteristics different from the first characteristics is sensed, the controller 180 may perform the function matched to the second characteristics. For example, when "knockknock" T having the second characteristics is "knockknock" T sequentially applied to different regions, the controller 180 may output a virtual keyboard or a visual keyboard for receiving information. Meanwhile, "knockknock" T sequentially applied to different regions may be an operation of inputting information by the user through a keyboard, and when "knockknock" T corresponding to such an operation is sensed, the controller may output a keyboard to provide more familiar UX (user experience) to the user.

As described above, the user of the mobile terminal according to the exemplary embodiment of the present disclosure may control the mobile terminal by simply tapping the mobile terminal in a state in which the display unit is deactivated. Namely, the mobile terminal according to the exemplary embodiment of the present disclosure may provide more intuitive and relatively simple user interface environment to the user.

Besides, in the mobile terminal according to the exemplary embodiment of the present disclosure, when "knockknock" is applied to the body of the mobile terminal or a spot outside of the terminal body in a state in which the display unit 151 is activated, screen information output to the display unit 151 or an application corresponding to the screen information may be controlled. For example, the controller 180 may change setting of the application corresponding to the screen information or change configuration information regarding information output through the application. Also, the controller 180 may perform different controlling according to a position to which "knockknock" is applied.

Hereinafter a method of executing different functions according to characteristics of "knockknock" in the mobile terminal according to the exemplary embodiment of the present disclosure will be described in detail.

Figure 8A:
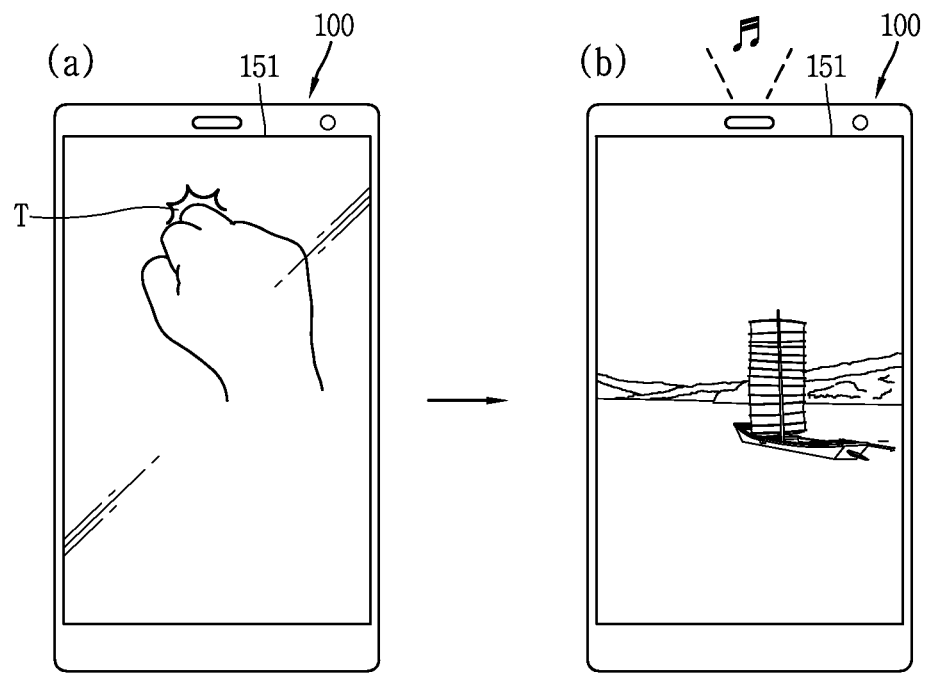
FIGS. 8A through 8C are conceptual views illustrating method of executing different functions according to tap objects in a mobile terminal according to an exemplary embodiment of the present disclosure.
Figure 8B:
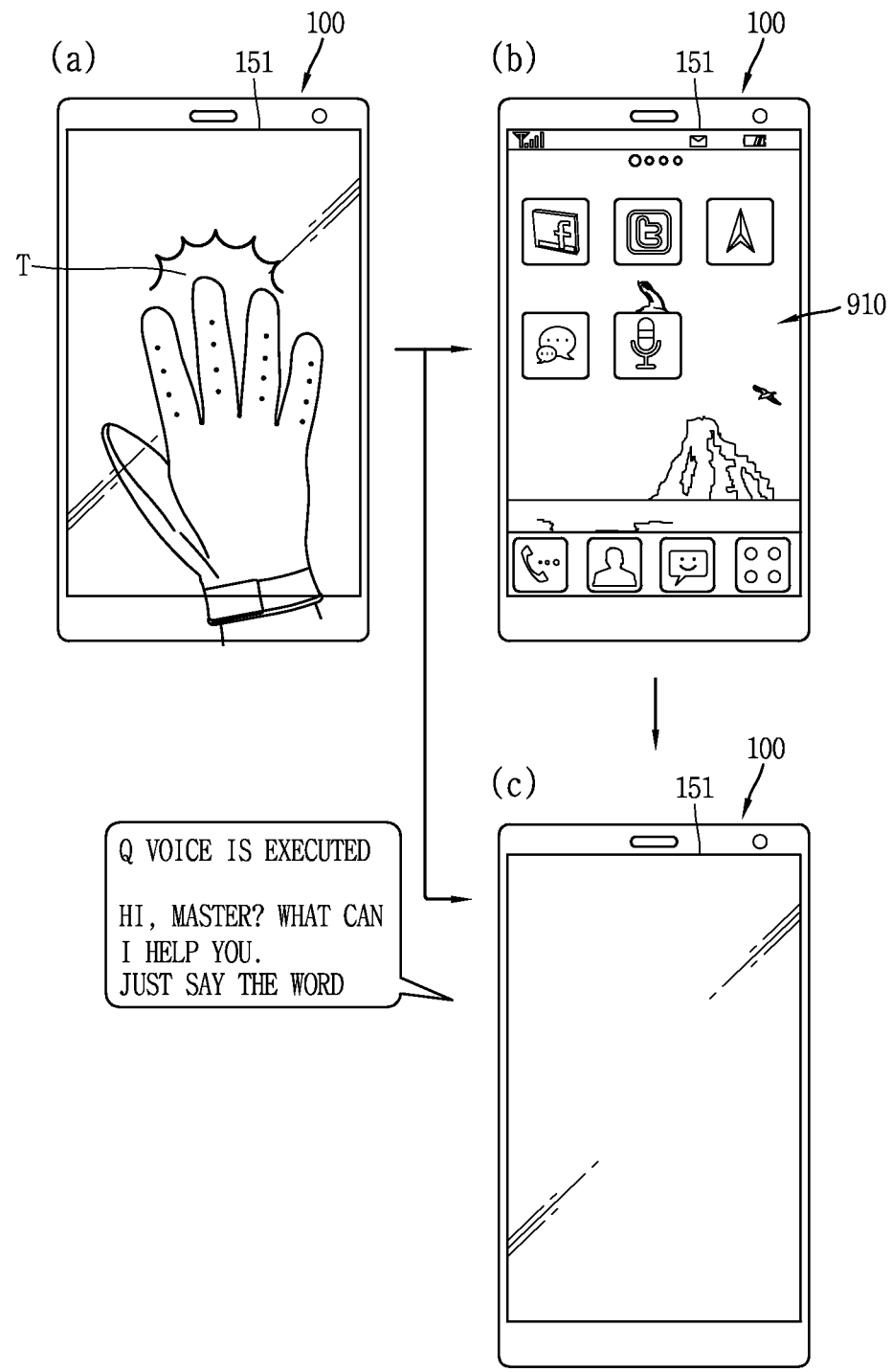
Figure 8C:
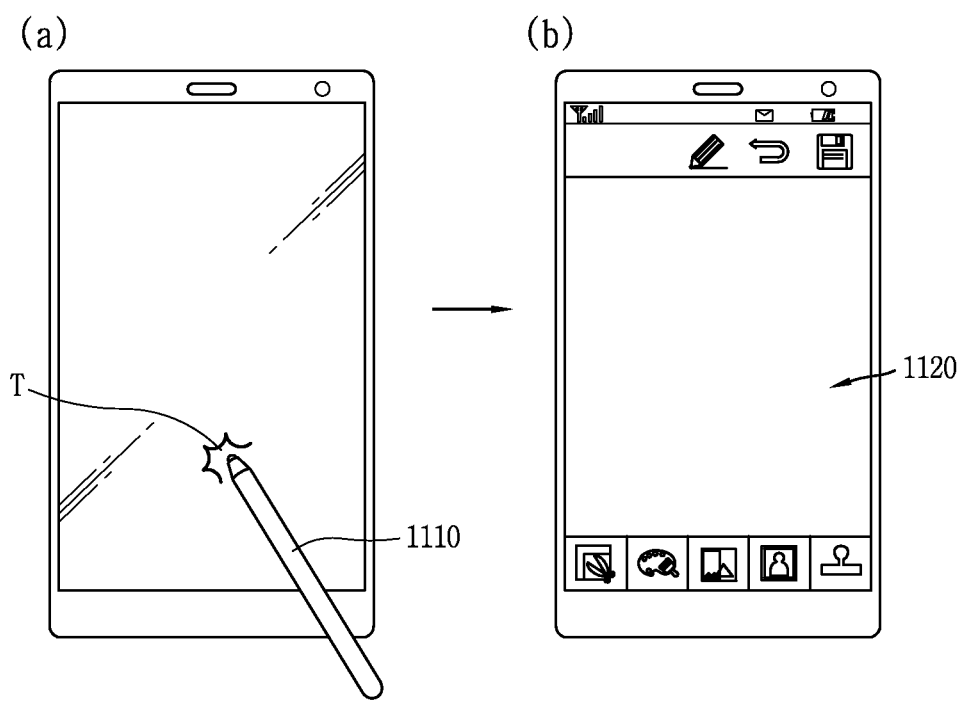

FIGS. 8A through 8C are conceptual views illustrating method of executing different functions according to tap objects in a mobile terminal according to an exemplary embodiment of the present disclosure. Types of the tap object may be distinguished by at least one sensor as described above with reference to FIG. 6. In the mobile terminal according to the exemplary embodiment of the present disclosure, the controller 180 may immediately perform a function previously matched to a corresponding attribute according to types of the subject.

For example, as illustrated in (a) of FIG. 8A, when "knockknock" T is applied to the terminal body by a knuckle, as illustrated in (b) of FIG. 8A, the controller 180 may output at least one of music and video. Here, the output music or video may be previously set or may be automatically selected by the controller 180.

Also, the controller 180 may differently control types of output music and video according to strength of "knockknock" T. for example, in a case in which strength of "knockknock" T is very strong, the controller 180 may output soft music.

In another example, when "knockknock" T is applied to the terminal body by a finger (the side with a fingerprint), the controller 180 may execute an application related to a social networking service (SNS) such as Facebook, and output a screen according to the execution to the display unit 151. The executed application may be changed according to setting by the user.

Also, as illustrated in (a) of FIG. 8B, when "knockknock" T is applied to the terminal body 100 (or the display unit 151) by a tap object unavailable for touch recognition, as illustrated in (b) of FIG. 8B, the locked state may be immediately released, or as illustrated in (c) of FIG. 8B, the voice recognition function may be executed. Here, the tap object unavailable for touch recognition may be a user's hand wearing a glove.

Also, as illustrated in (a) of FIG. 8C, when "knockknock" T is applied to the terminal body 100 (or the display unit 151) by a touch pen (or a stylus pen), as illustrated in FIG. (b) of FIG. 8C, the controller 180 may immediately activate a memo function (or a memo application).

FIGS. 9A through 11 are conceptual views illustrating a method of executing different functions according to spots to which a tap is applied in a mobile terminal according to an exemplary embodiment of the present disclosure.

In the mobile terminal according to the exemplary embodiment of the present disclosure, different functions may be controlled according to a spot to which a tap is applied (or a position to which "knockknock" is applied).

Figure 9A:
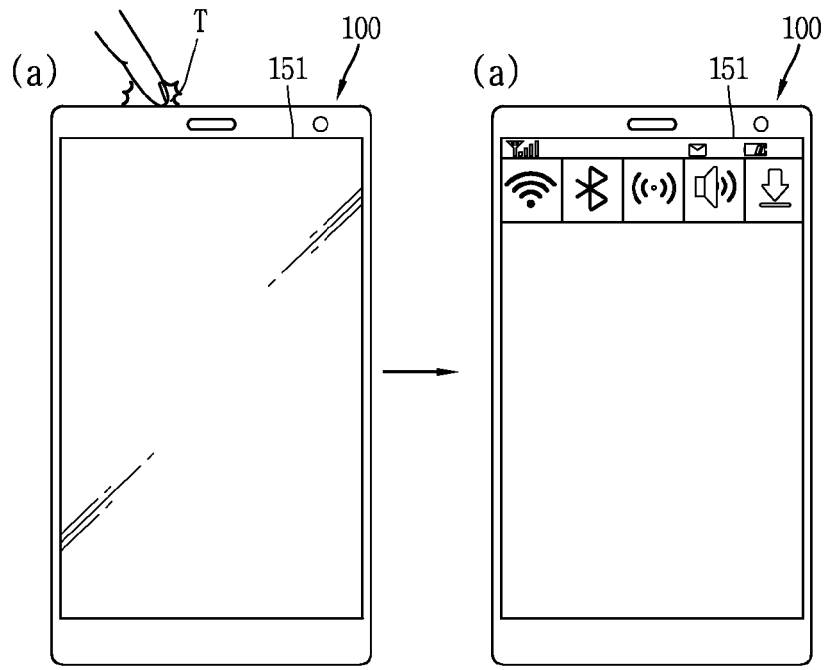
FIGS. 9A through 11 are conceptual views illustrating a method of executing different functions according to spots to which tapping is applied in a mobile terminal according to an exemplary embodiment of the present disclosure.

For example, as illustrated in FIG. 9A, in a case in which "knockknock" T is applied to an upper end of the terminal body 100 of the mobile terminal, an operation manager screen may be output to the display unit 151. The operation manager screen may include information regarding at least one application being executed, information regarding a generated event, and short icons.

Also, when "knockknock" T is applied again to the upper end of the terminal body 100, the operation manager screen may be terminated. Also, after the operation manager screen is output, in a case in which a user input is not input for a pre-set period of time, the display unit 151 may be automatically deactivated. In another example, as illustrated in FIG. 9B, when "knockknock" T is applied to the side of the terminal body 100 while the screen according to execution of a Web browser is output, a bookmark screen with respect to the Web browser may be output.

Figure 9B:
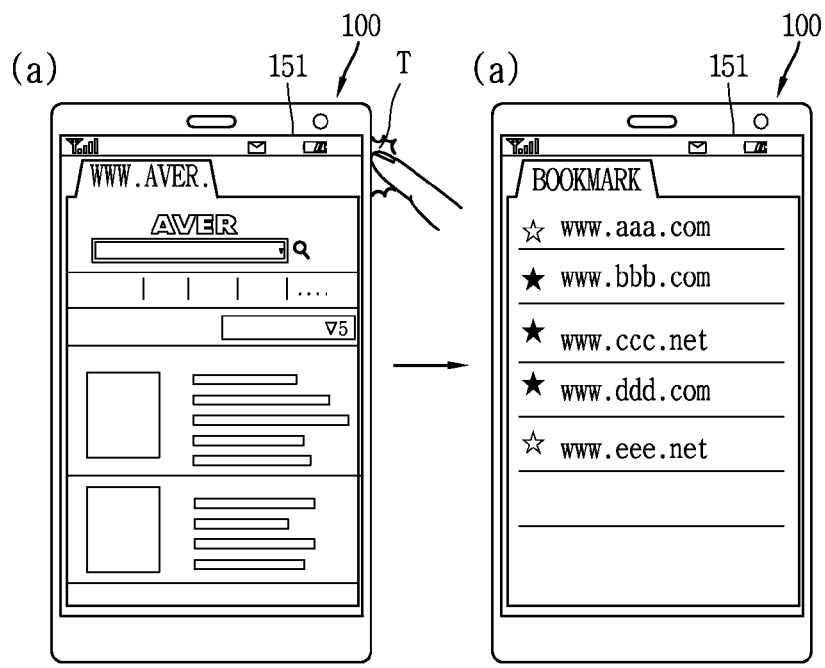
Figure 9C:
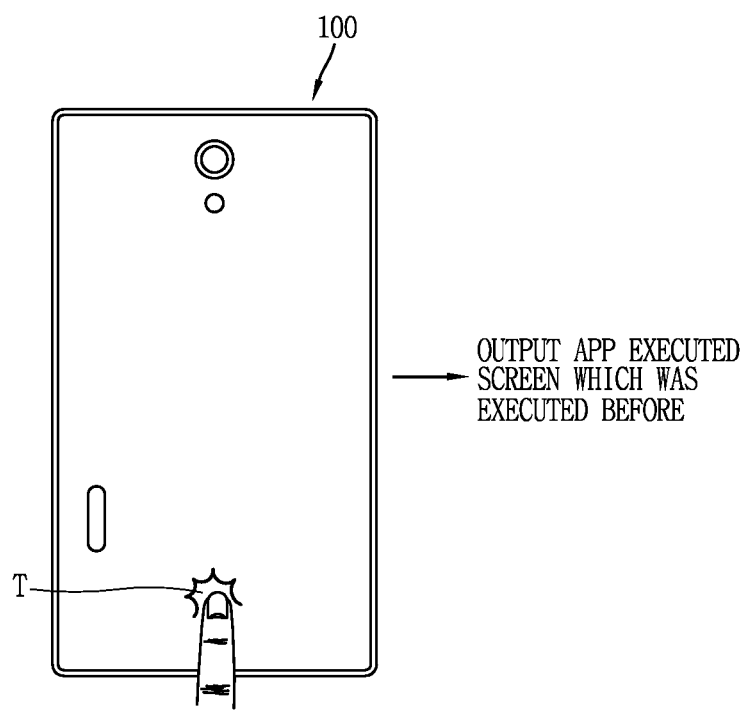

In another example, as illustrated in FIG. 9B, in a case in which "knockknock" T is applied to the rear case 102 (please refer to FIG. 1), the controller 180 may output an executed screen of a previously executed application to the display unit 151. Namely, a screen conversion function may be executed by "knockknock" T applied to the rear case 102 (please refer to FIG. 1).

Also, in the case in which "knockknock" T is applied to the rear case 102 (please refer to FIG. 1), the controller 180 may terminate at least one of a plurality of applications being driven, and output another executed screen to the display unit 151. Also, whenever "knockknock" T is applied, the plurality of applications being driven may be sequentially terminated.

Although not shown, in a case in which "knockknock" T is applied to the rear case 102 and an object adjacent to the front side of the terminal body is sensed by the proximity sensor, the controller 180 may execute a function related to 'voice'. In such a case, the display unit 151 may not be currently available to be used, and thus, the function related to 'voice' may be executed to enhance user convenience.

The controller 180 may output current situation information (for example, event reception information, current time information, weather information, state information (battery, communication state, position, and the like) of the mobile terminal through voice. Also, when the outputting of the situation information is completed, the controller 180 may continuously execute the voice recognition function.

Figure 10A:
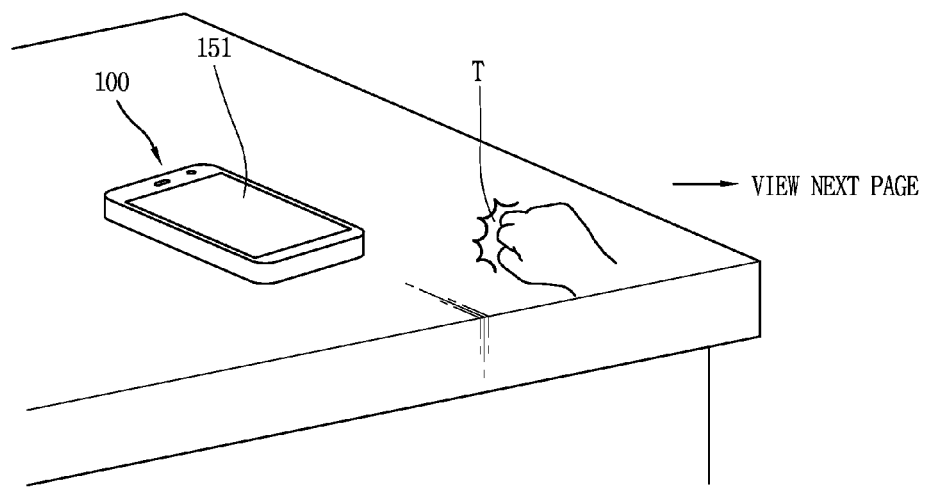
Figure 10B:
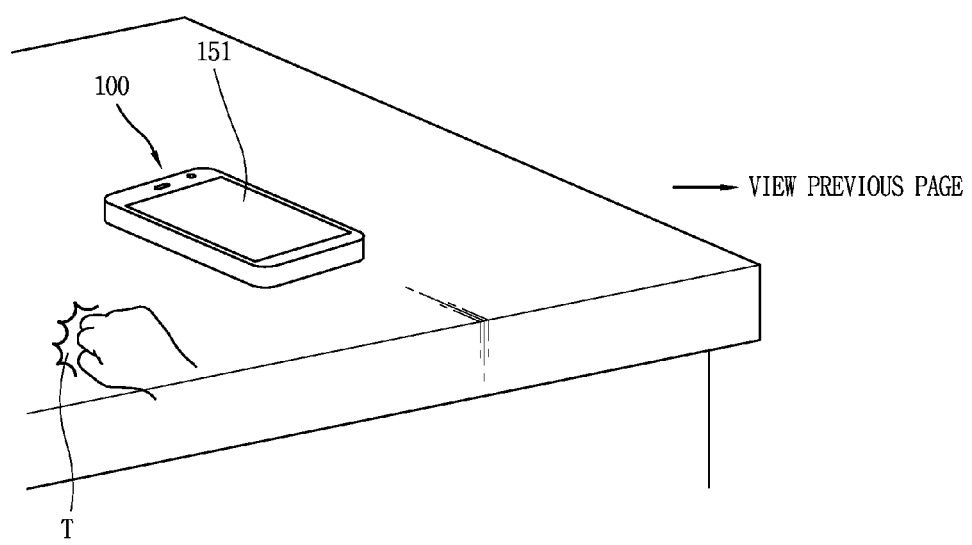

A spot to which a tap is applied may be formed in an area outside of the terminal body. Referring to FIGS. 10A and 10B, "knockknock" T may be applied to an object on which the terminal body is placed, and the mobile terminal 100 may sense "knockknock" T applied to the spot outside of the terminal body.

In this case, different functions may be executed according to which position based on the terminal body "knockknock" T is applied. For example, in a state in which an application related to a photo or a book is executed and an image is output to the display unit 151, when "knockknock" T is applied to the right of the terminal body, a next image instead of the current image may be output, and when "knockknock" T is applied to the left of the terminal body, a previous image, instead of the current image, may be output.

In another example, in a state in which an application related to music is executed and music is being played, when "knockknock" T is applied to the right of the terminal body, next music instead of the music being played may be output, and when "knockknock" T is applied to the left of the terminal body, previous music instead of the music being played may be played.

In this manner, in the mobile terminal according to an exemplary embodiment of the present disclosure, different controlling may be performed according to "knockknock" T applied to different positions. Also, the different positions may be positions that may be generally or conceptually recognized by the user, and accordingly, the controller 810 may provide more familiar user experience (UX) to the user.

Figure 11:
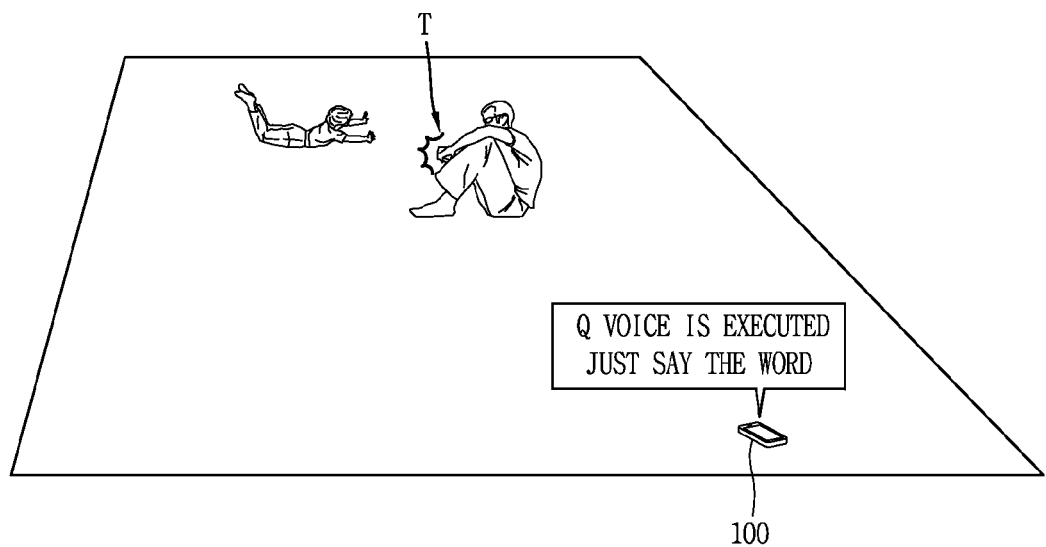

Also, as illustrated in FIG. 11, in a case in which "knockknock" T is applied to a neighboring object, rather than the body 10 of the mobile terminal, the controller 180 may output notification information. Namely, in the mobile terminal according to the exemplary embodiment of the present disclosure, in a case in which the user does not know where the terminal is placed, when "knockknock" T is applied to a neighboring object, notification information may be output. The notification information may be output through at least one of a visual, tactile (for example, vibration), and audible method.

In this case, only when a tap applied to the neighboring object is sensed by a predetermined distance or greater or within the predetermined period based on the terminal body, the controller 180 may output the notification information.

Figure 12A:
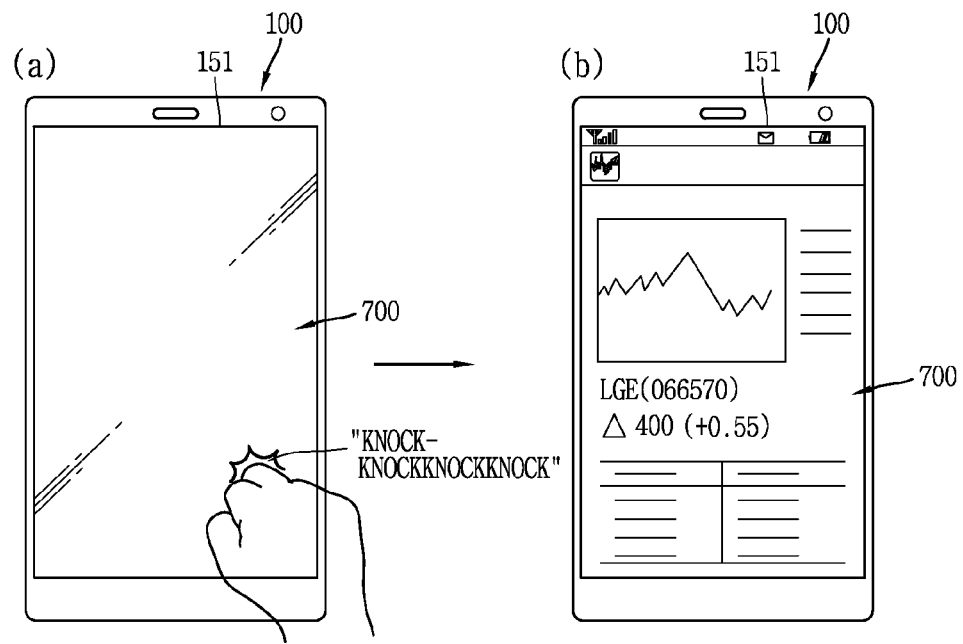
FIGS. 12A and 12B are conceptual views illustrating a method of executing different functions according to patterns of tapping in a mobile terminal according to an exemplary embodiment of the present disclosure.
Figure 12B:
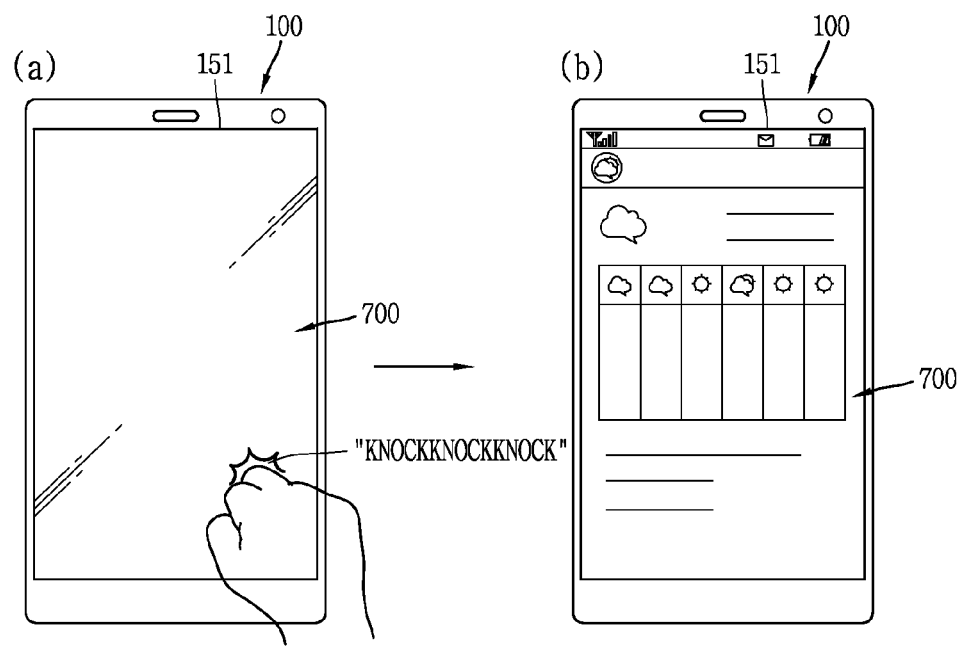

FIGS. 12A and 12B are conceptual views illustrating a method of executing different functions according to patterns of tapping in a mobile terminal according to an exemplary embodiment of the present disclosure.

The mobile terminal according to the exemplary embodiment of the present disclosure may distinguish a pattern of "knockknock" by using the sensing unit 140 and other sensors included in the sensing unit 140. For example, in a case in which "knockknock" is applied in a "knock-knock-knockknock" pattern, the accelerometer 145 may generate a first control signal, and when "knockknock" is applied in a "knockknock-knock" pattern, the accelerometer 145 may generate a second control signal. Also, the controller 180 may control functions corresponding to the first and second control signals.

Referring to FIGS. 12A and 12B, when "knockknock" is applied in a state in which the display unit 151 is deactivated, different functions may be executed according to the "knockknock" pattern. For example, when a pattern of "knock-knockknockknock" is sensed, an application related to stock may be executed, and a pattern of "knockknock-knock" is sensed, an application related to weather may be executed.

Meanwhile, in the pattern of "knockknock", "-" may refer to an operation of not releasing a contact during a predetermined period of time in a state in which a tap is in contact with an object, like a dash of the Morse code. Alternatively, it may also refer to a state in which a tap is not applied during a predetermined period of time between taps. For example, in case of "knockknock", an interval between taps may be less than one second, and in case of "knock-knock", an interval between taps may be one second or more.

FIGS. 13 through 15D are conceptual views illustrating a method of controlling functions according to a touch input applied after tapping in the mobile terminal according to an exemplary embodiment of the present disclosure.

In the mobile terminal according to the exemplary embodiment of the present disclosure, in a state in which a sleep mode is executed, a touch sensor is deactivated but the accelerometer may sense "knockknock" in an activated state.

However, in a case in which a first tap is sensed by the accelerometer, the touch sensor may be activated and a second tap may be sensed. In the case in which the second tap is sensed by the accelerometer and the touch sensor, the controller 180 may execute a function corresponding to a touch input sensed by the touch sensor.

Figure 13:
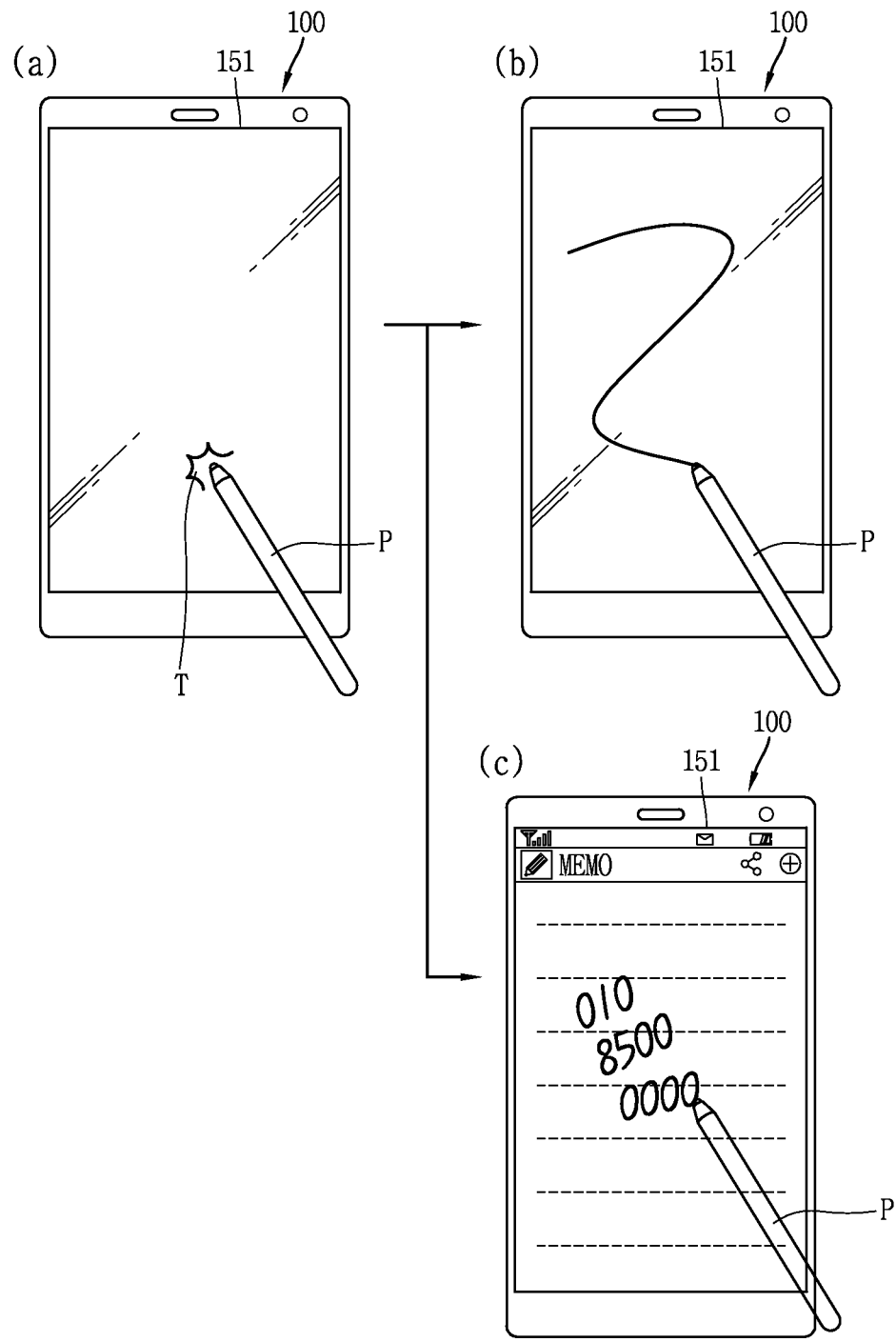
FIGS. 13 through 15D are conceptual views illustrating a method of controlling functions according to a touch input applied after tapping in the mobile terminal according to an exemplary embodiment of the present disclosure.
Figure 14:
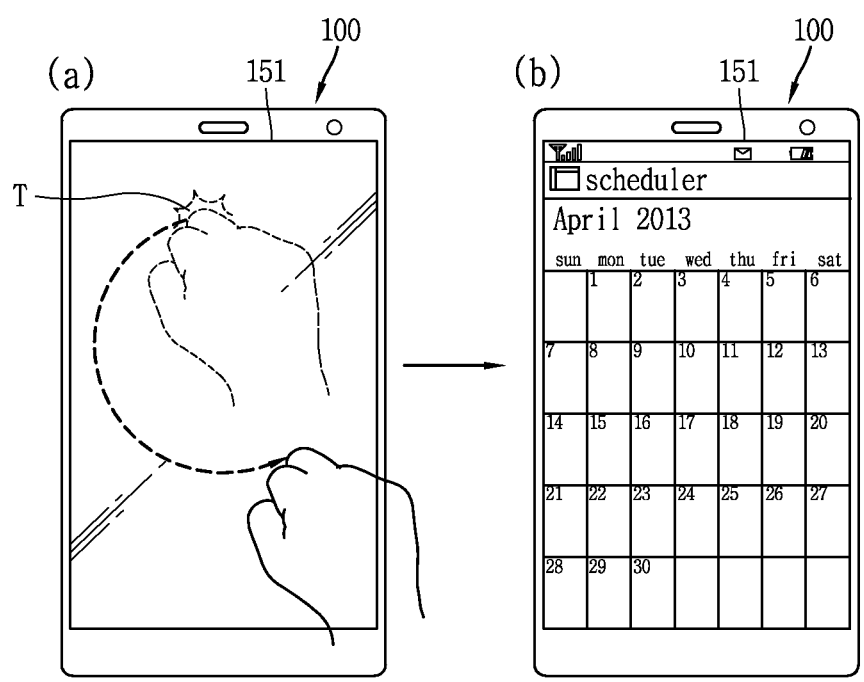

For example, as illustrated in (a) and (b) of FIG. 13, when "knockknock" T is sensed, the controller 180 may display a trace corresponding to a touch operation of the user using a pen P, or the like. Namely, in response to "knockknock" T, the controller 180 may execute an application related to memo, and execute a memo function displaying a touch trace of the user in response to a touch input applied thereafter. Meanwhile, as illustrated in (c) of FIG. 13, in a state in which the display unit 151 is deactivated, the memo function may be executed according to "knockknock" T and a touch input.

Although not shown, when "knockknock" is newly applied by palm in a state in which the memo function is executed, the existing memo is stored and a new memo page may be generated. Namely, by using the memo function through a relatively simple operation, quick memo may be executed to quickly write contents desired to be recorded.

Meanwhile, the second tap may be deformed into a touch input continuously moving from a spot from which the second tap is sensed to a certain spot. This may be referred to as a "knockknock and drag".

For example, the user may apply "knockknock" as first and second taps to the touch screen by using his or her finger. In this case, the second tap, in a state of being in contact with the touch screen without being separated therefrom, may be continuously moved from the spot to which the second tap is applied to a certain spot. The second tap may be released from a certain spot.

The controller 180 may execute an application previously matched to a symbol formed a touch trace. For example, as illustrated in FIGS. 14A and 14B, in a case in which a symbol formed by knockknock and drag is "C", the controller 180 may execute a calendar application previously matched to "C". Accordingly, the user may immediately execute a desired application by drawing a particular symbol through the knockknock and touch trace on the touch screen, without having to search an icon of the application desired to be executed.

Besides, in a case of a drag input continuously moving from the spot from which the second tap is detected the second tap according to "knockknock" to a certain spot, different functions may be executed according to directions of the drag input.

Figure 15A:
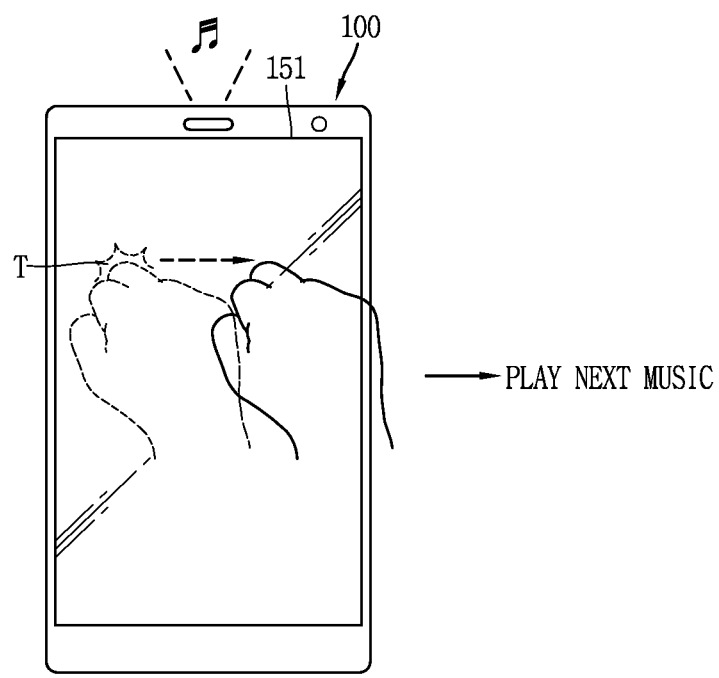
Figure 15B:
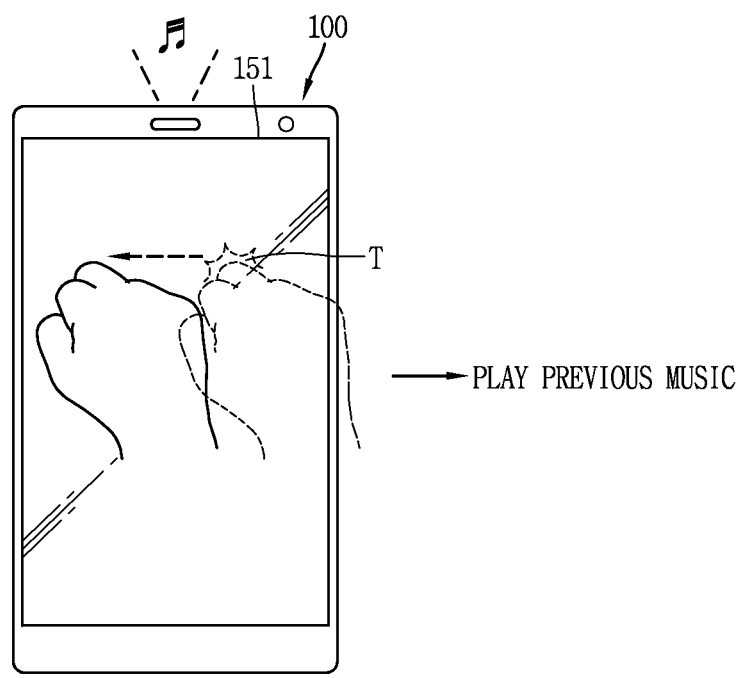

For example, as illustrated in FIGS. 15A and 15B, in a case in which a music play function is executed in a state in which lighting of the display unit 151 is turned off, the controller 180 may control the music play function in response to "knockknock and drag" applied to the display unit 151. For example, in response to "knockknock and drag", the controller may adjust a volume of music being played or change played music to different music. In addition, the controller 180 may variously control the music play function according to a position (the drag direction by the second tap) of a spot from which the second tap, which has been moved from a spot to which the second tap was applied, is released.

For example, as illustrated in FIG. 15A, in a case in which "knockknock" T is applied to a certain region of the display unit 151 and a second tap applied to a spot is moved in a rightward direction and released, the controller 180 may change currently played music to next music. As illustrated in FIG. 14B, when the second tap applied to a spot is moved in a leftward direction and released, the controller 180 may play the previous music of the current music again.

Figure 15C:
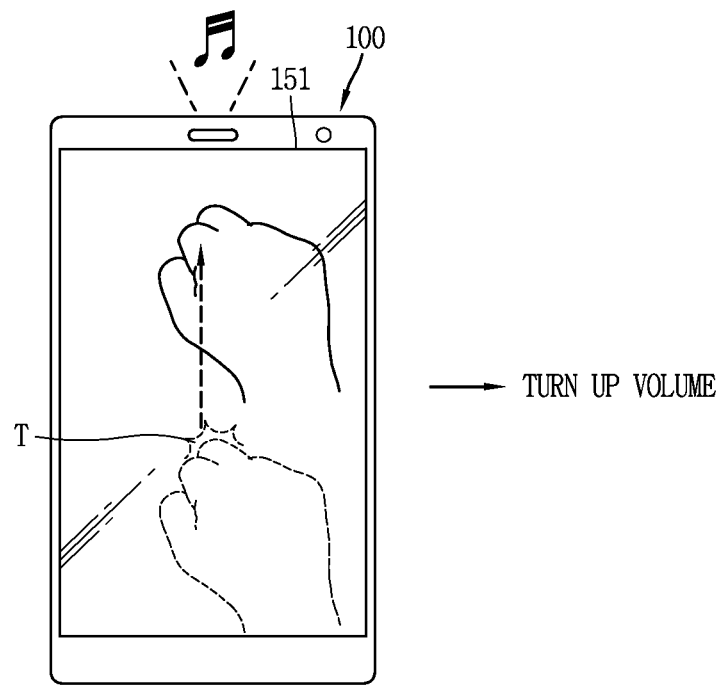
Figure 15D:
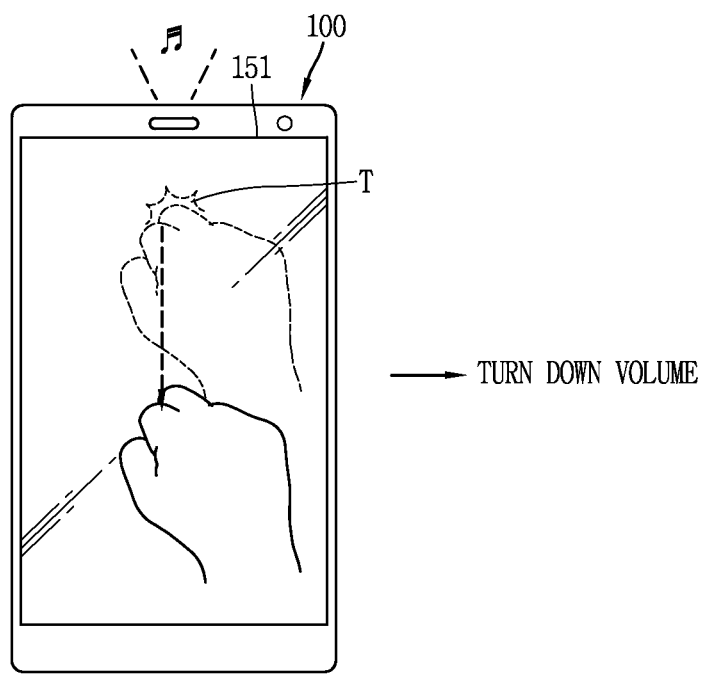

In addition, as illustrated in FIG. 15C, when "knockknock" T is applied to a certain region of the display unit 151 and the second tap applied to a spot is continuously moved toward the upper end of the terminal body and released, the controller 180 may turn up a volume (or sound volume). Also, as illustrated in FIG. 15D, when the second tap applied to a spot is continuously moved toward a lower end of the terminal body and released, the controller 180 may turn down the volume.

Meanwhile, although not shown, the controller may differentiate a degree of controlling according to a movement distance of a drag input. For example, when "knockknock and drag" for adjusting a volume is sensed, the controller 180 may differently control a degree of adjusting a volume according to a movement distance of the drag input. In a specific example, in a case in which a drag input is moved upwardly by a distance '1', the controller 180 may turn up the volume by stage '1', and in a case in which a drag input having a distance '3' greater than the distance '1' is input, the controller 180 may turn up the volume by stage '3'.

In this manner, the mobile terminal according to the exemplary embodiment of the present disclosure provides the new interface called "knockknock and drag", as well as "knockknock", thereby providing more familiar user experience (UX) to the user.

Figure 16:
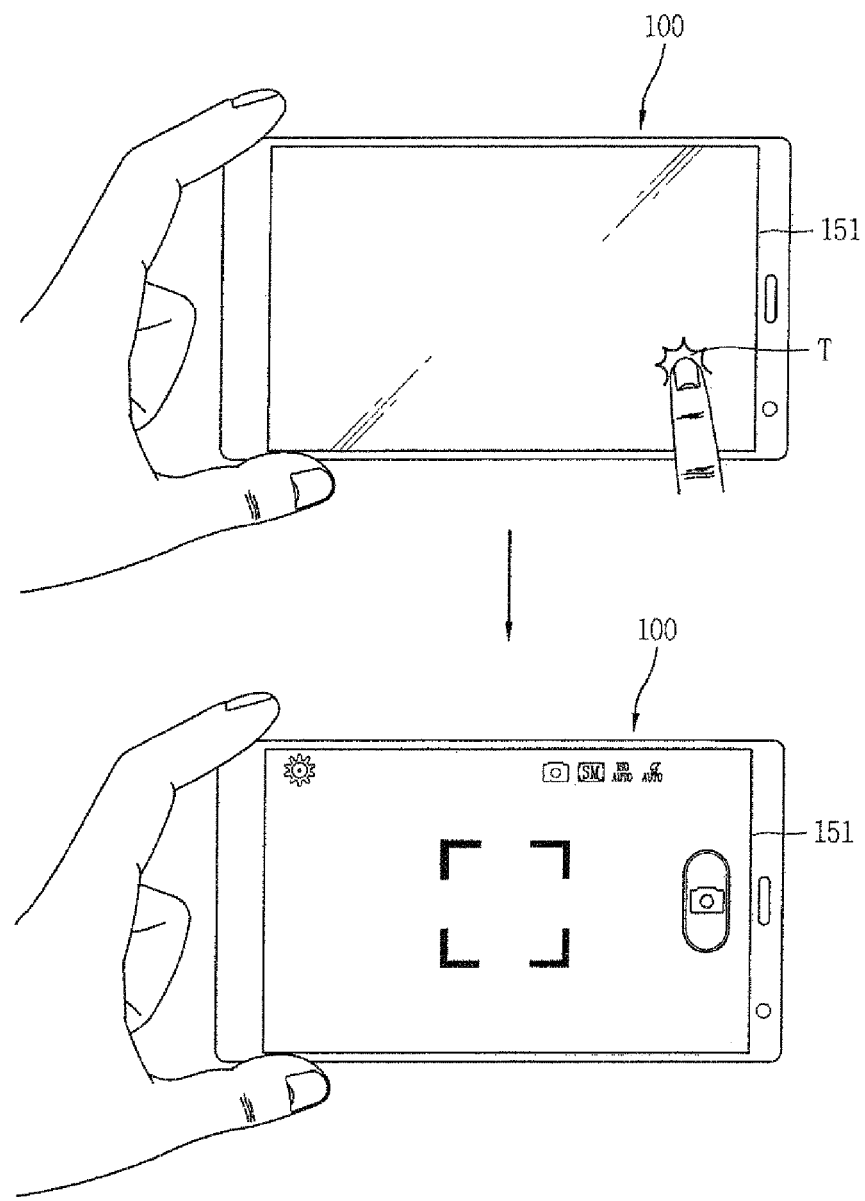
FIG. 16 is a conceptual view illustrating a method of controlling a mobile terminal in response to tapping applied to the mobile terminal in a particular situation according to an exemplary embodiment of the present disclosure.

Meanwhile, the controller 180 may control a different function according to a state in which the mobile terminal is placed. FIG. 16 is a conceptual view illustrating a method of controlling a mobile terminal in response to tapping applied to the mobile terminal in a particular situation according to an exemplary embodiment of the present disclosure.

For example, as illustrated in FIG. 16, in a state in which the terminal body is placed in a landscape (or horizontal) direction, when "knockknock" is applied, the controller 180 may activate the camera in response to "knockknock" and execute an application related to the camera. In this case, although the mobile terminal is in a locked state, the controller 180 may output a camera function screen.

In this manner, when "knockknock" is applied in the landscape direction, the application related to the camera is immediately executed, and thus, a user operation for executing an application may be reduced and user convenience may be increased.

Figure 17:
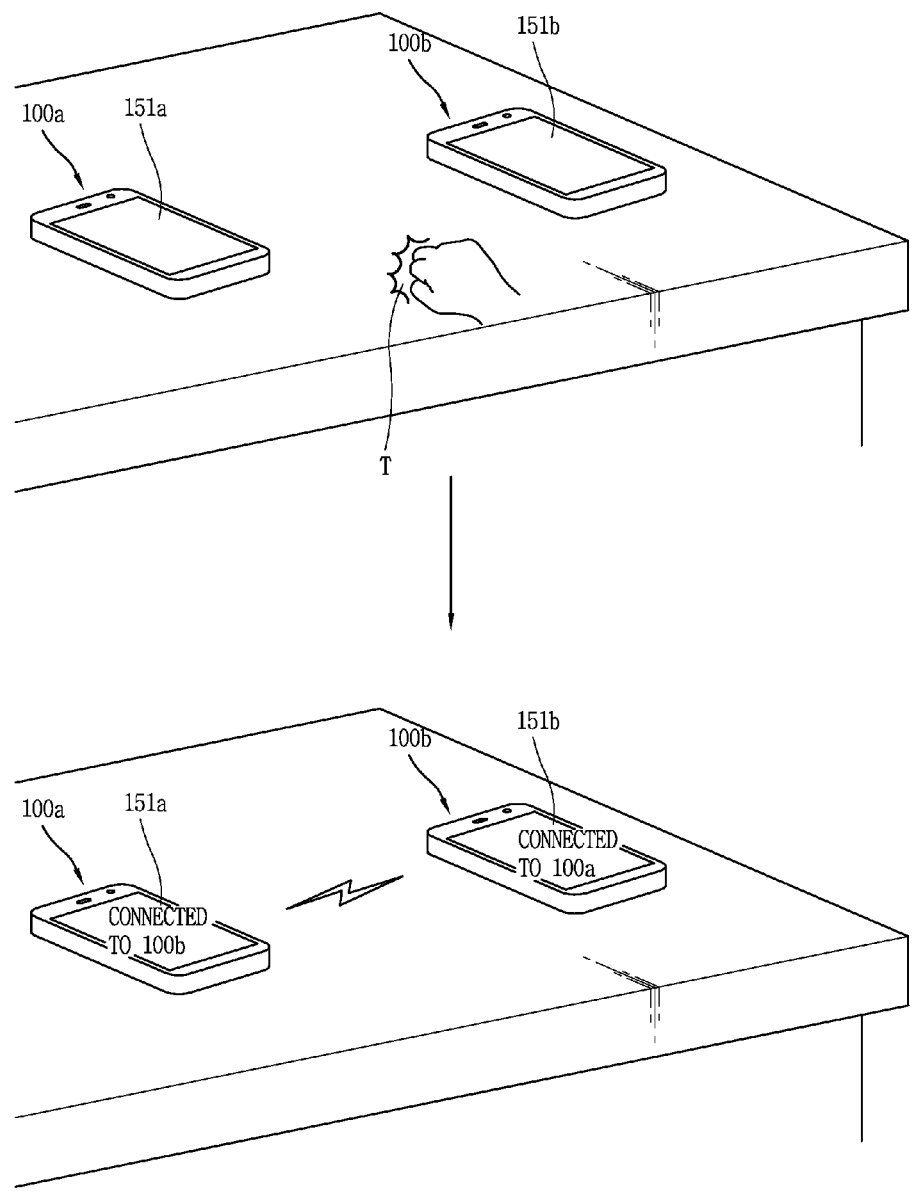
FIG. 17 is a conceptual view illustrating a method of connecting a plurality of mobile terminals as they sense the same tapping according to an exemplary embodiment of the present disclosure.

Meanwhile, a plurality of terminals may be activated by "knockknock" and perform communication. FIG. 17 is a conceptual view illustrating a method of connecting a plurality of mobile terminals as they sense the same tapping according to an exemplary embodiment of the present disclosure.

For example, as illustrated in FIG. 17, first and second terminals 100a and 100b may be placed on the same object such as a table. In this case, in a case in which "knockknock" T tapping the desk is applied, the first and second terminals 100a and 100b may sense "knockknock" T at a similar point in time. Namely, since distances between the position of the mobile terminals and the spot to which "knockknock" T is applied are different, points in time at which "knockknock" T is sensed may be different.

Meanwhile, in a case in which "knockknock" T applied to a spot outside of the terminal body is sensed, each mobile terminal may activate the wireless communication unit to search for a different mobile terminal which has sensed the same "knockknock" T. A different terminal which has sensed the same "knockknock" T is searched, each mobile terminal may connect a channel for sharing data. Thus, by applying "knockknock" T tapping the object on which the plurality of terminals are placed, sync may be simply connected between the devices.

In a case in which a channel for sharing data is connected, the controller 180 may output a name of a connected terminal or a list of content that may be transmitted to the display unit 151. When at least one content is selected by the user, the selected content may be transmitted to the different terminal connected thereto.

Meanwhile, in the mobile terminal according to the exemplary embodiment of the present disclosure, the controller 180 may deactivate the display unit in response to "knockknock". Hereinafter a method for deactivating the display unit will be described in detail with reference to FIG. 18.

Figure 18:
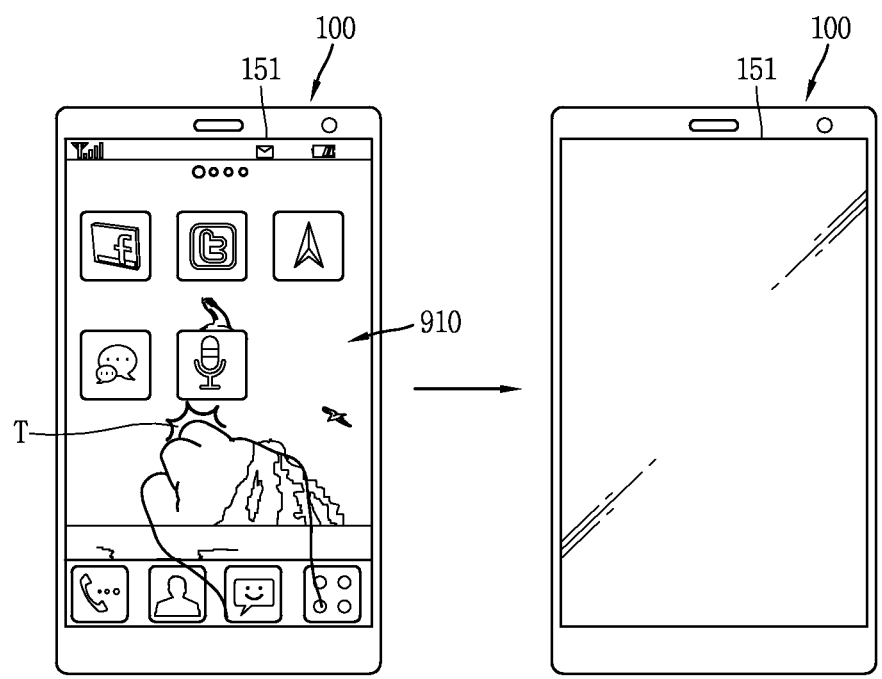
FIG. 18 is a conceptual view illustrating an operation example of deactivating a display unit in response to tapping in a mobile terminal according to an exemplary embodiment of the present disclosure.

FIG. 18 is a conceptual view illustrating an operation example of deactivating a display unit in response to tapping in a mobile terminal according to an exemplary embodiment of the present disclosure. Referring to FIG. 18, screen information such as an executed screen, a standby screen, a locked screen, and the like, corresponding to one or more functions may be output to the display unit 151.

In the state in which the screen information is output to the display unit 151, when "knockknock" is sensed, the controller 180 may deactivate the display unit 151.

Besides, in a case in which one or more functions are being executed when "knockknock" is applied, the controller 180 may terminate at least one of the functions. For example, when "knockknock" is applied in a state in which audio is output through the speaker, the controller 180 may deactivate the speaker together with the display unit 151.

Namely, a sleep mode in which the mobile terminal is on standby, while consuming minimum power, or a doze mode in which the touch sensor is periodically activated may be executed by "knockknock".

Meanwhile, in order to prevent the sleep mode or the doze mode from being erroneously executed by "knockknock", only when "knockknock' is applied to an empty space in which an object to be executed by a touch is not positioned in the entire region, the sleep mode may be executed. For example, in a case in which "knockknock" is applied to a region in which an icon is not output in a state in which a home screen is output to the display unit 151, the sleep mode may be executed. In another example, in a case in which "knockknock" is applied to a region other than the display unit, the sleep mode may be executed.

So far, the exemplary embodiments of the present disclosure in which "knockknock" is sensed by using the accelerometer, or the like, and functions of the terminal are controlled based on the characteristics of "knockknock" and a terminal state when "knockknock" is sensed have been described. However, in the exemplary embodiments of the present disclosure, "knockknock" is not necessarily sensed only by the accelerometer and may be sensed by any sensor that may be easily replaced by a person skilled in the art to which the present invention pertains.

For example, a tap, namely, "knockknock", applied to the display unit may be sensed by using the touch sensor.

Also, in such a case, in the mobile terminal according to the exemplary embodiment of the present disclosure, even in a state in which the display is deactivated (or OFF), the touch sensor may be activated (or turned on) to sense a tap applied to the display unit. Meanwhile, in the case in which the display unit is deactivated (or OFF), the controller 180 may control the touch sensor to be deactivated (or OFF) during a predetermined period of time and to be activated during a predetermined period of time, rather than to be constantly activated (or ON). Namely, by periodically switching the touch sensor to the activated state and the deactivated state, power consumed as the touch sensor is constantly activated (or ON) may be reduced.

In an example, in a state in which the touch sensor is periodically activated, the terminal 100 may sense "knockknock", a tap, applied to the touch sensor by using the touch sensor. Namely, in a case in which a first tap is applied and a second tap is input to a predetermined region within a limited period of time, the controller 180 may determine that "knockknock" has been sensed, and control at least one of executable functions in the mobile terminal.

In FIGS. 5 and 6, the method of sensing "knockknock" by using the accelerometer has been described. Hereinafter, a method of sensing "knockknock" by using the touch sensor will be described. The foregoing exemplary embodiments described above with reference to FIGS. 7 through 18 may also be applied to the mobile terminal, namely, the mobile terminal that senses "knockknock" by using the touch sensor, in the same manner, and descriptions of the same contents will be omitted.

Figure 19:
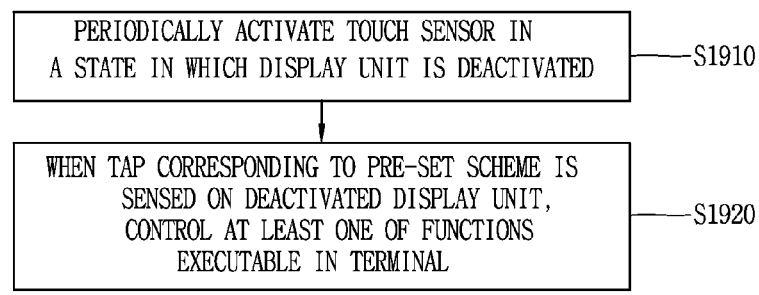
FIG. 19 is a flow chart specifically illustrating a method of using a touch sensor in the control method illustrated in FIG. 4.
Figure 20:
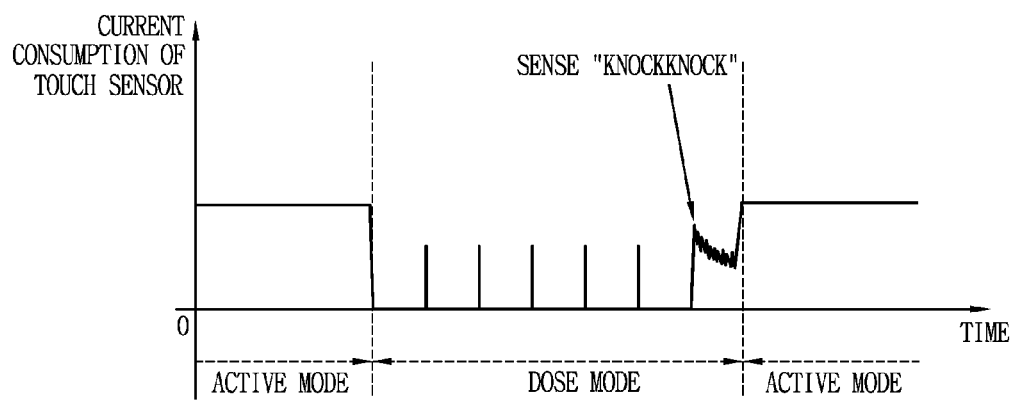
FIG. 20 is a view illustrating current consumption of the touch sensor in a mobile terminal according to an exemplary embodiment of the present disclosure.

FIG. 19 is a flow chart specifically illustrating a method of sensing a tap applied to a terminal by using a touch sensor in the control method illustrated in FIG. 4, and FIG. 20 is a view illustrating current consumption of the touch sensor in a mobile terminal according to an exemplary embodiment of the present disclosure.

Referring to FIG. 19, in the mobile terminal according to the exemplary embodiment of the present disclosure, in a state in which the display unit is deactivated, the touch sensor may be periodically activated in step S1910.

Here, the "state in which the display unit 151 is deactivated" may refer to a state in which lighting provided to illuminate the display unit 151 is in an OFF state. Namely, in the state in which the display unit 151 is deactivated, no information or graphic image is displayed on the display unit 151.

Conversely, a 'state in which the display unit 151 is activated' refers to a state in which lighting provided to illuminate the display unit is in an ON state and screen information such as an executed screen, a standby screen, a locked screen, or the like, corresponding to one or more functions may be output to the display unit 151.

Meanwhile, the touch sensor may form an interlayered structure with the display unit 151, and may be disposed to correspond to a display region of the display unit 151. The touch sensor may sense a tap applied by a touch subject to a particular portion of the display unit 151, and may detect even pressure at which a tap is applied, as well as a position and an area of the tap applied by the touch subject to the touch sensor. Here, the touch subject is an object applying a touch to the touch sensor and include, for example, a finger, a touch pen, a stylus pen, a pointer, and the like.

Meanwhile, the touch sensor may be formed to sense a tap by using different methods in a state in which the display unit 151 is activated or deactivated. In this case, the different methods may be related to an activation period of the touch sensor. In detail, the touch sensor may be activated at different periods according to whether the display unit 151 is activated. Namely, the touch sensor may sense a tap applied thereto at different activation periods according to whether the display unit 151 is activated.

For example, in a state in which the display unit 151 is deactivated, the touch sensor may be activated at a pre-set particular period. In this case, the particular period may be a period corresponding to a time greater than 0. Also, in a state in which the display unit 151 is activated, the touch sensor may always be operated in an activated state. Namely, in this case, the activation period of the touch sensor may be 0 of a period having a time close to 0.

Meanwhile, referring to FIG. 20, whether the touch sensor is activated may be distinguished by using power consumption of the touch sensor. For example, power consumption of the touch sensor is equal to or smaller than a reference value previously set based on 0, the touch sensor corresponds to a deactivated state, and when power consumption of the touch sensor exceeds the reference value previously set based on 0, the touch sensor may be in an activated state.

Referring to FIG. 20, in a state in which the display unit 151 is activated (active mode), the touch sensor may maintain the activated state and waits for application of a tap to the display unit 151. Meanwhile, in a case in which the display unit 151 is deactivated (dose mode), the touch sensor may be activated at every pre-set particular period.

Meanwhile, as the particular period at which the touch sensor is activated is shorter, a speed at which a tap applied to the display unit 151 becomes faster, but power consumed by the touch sensor may be increased. On the other hand, as the period at which the touch sensor is activated is longer, power consumed by the touch sensor may be reduced but a speed at which a tap is applied to the display unit 15 may be slowed.

Thus, the particular period may be set such that a sensing speed for sensing a tap applied to the display unit 151 is faster but not recognized by the user, while efficiency of power consumption is increased. For example, the particular period may be set such that the touch sensor in a deactivated state is activated 20 times (1 Hz) per second.

Meanwhile, while the display unit 151 is in an activated state, the touch sensor may also be activated together, and in the activated state, an activation period T of the touch sensor may be 0 or may be close to 0. Alternatively, in the state in which the touch sensor is activated, a period of the touch sensor may be shorter by several times than the particular period set for the touch sensor to be activated thereby in the state in which the display unit 151 is deactivated. Namely, the touch sensor may be activated at different periods according to whether the display unit 151 is activated.

Referring back to FIG. 19, in a case in which a tap corresponding to a pre-set method is sensed on the display unit in a deactivated state, the controller 180 may control at least one of functions executable in the mobile terminal in step S1920.

Meanwhile, the step of sensing a tap and the step of controlling at least one of the executable functions have been described in the steps S410 and S420 with reference to FIG. 4, so a detailed description thereof will be omitted.

However, according to the mobile terminal according to the exemplary embodiment of the present disclosure illustrated in FIG. 20, in the doze mode in which the display unit 151 is deactivated and the touch sensor is periodically activated, when "knockknock" is sensed by the touch sensor, the controller 180 may switch the doze mode into an active mode in which the display unit and the touch sensor are activated.

In this manner, in the mobile terminal according to the exemplary embodiment of the present disclosure, since "knockknock" is sensed by the touch sensor, a tap applied to the display unit 151 may be accurately sensed. Also, in the mobile terminal according to the exemplary embodiment of the present disclosure, since the touch sensor is periodically activated, efficiency of power consumption may be increased.

Hereinafter, modes in which the display unit and the touch sensor in the mobile terminal according to the exemplary embodiment of the present disclosure, like the doze mode and the active mode as described above, will be described in detail.

Figure 21:
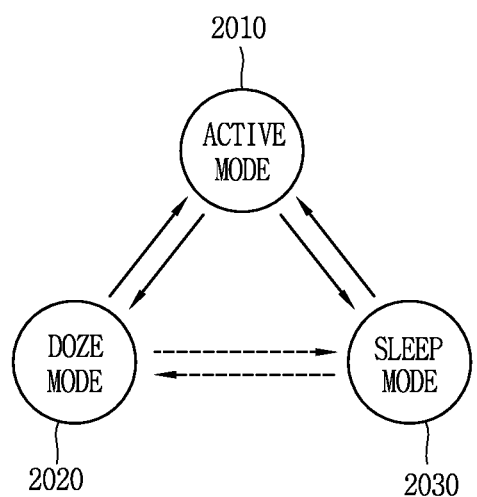
FIG. 21 is a view illustrating a mode in which the display unit and the touch sensor operate in a mobile terminal according to an exemplary embodiment of the present disclosure.

FIG. 21 is a view illustrating a mode in which the display unit and the touch sensor operate in a mobile terminal according to an exemplary embodiment of the present disclosure.

Referring to FIG. 21, in the mobile terminal according to the exemplary embodiment of the present disclosure, operation modes of the mobile terminal may be divided into an active mode 2010, a sleep mode 2030, and a doze mode 2020 according to operational states of the display unit 151 and the touch sensor.

The active mode 2010 refers to a state in which both the display unit 151 and the touch sensor are activated. Namely, the active mode refers to a state in which lighting of the display unit 151 is turned on, the touch sensor is activated to receive a user input with respect to an icon or a graphic object output to the display unit 151, and power is continuously consumed.

On the other hand, the sleep mode 2030 may refer to a state in which both the display unit 151 and the touch sensor are deactivated. Lighting of the display unit 151 is turned off and any function is not executed even through a touch is applied to the display unit 151.

The doze mode 2020 may refer to a state in which the touch sensor is periodically activated in a state in which the display unit 151 is deactivated. The doze mode may refer to a state for receiving "knockknock" in a state in which the display unit 151 is deactivated.

The touch sensor may sense a tap applied to the display unit 151 in different manners in the doze mode 2020 and the active mode 2010. Besides, settings related to an operation of the touch sensor may be different in the doze mode 202 and the active mode 2010.

For example, threshold values set for recognizing a tap may be differently set. Namely, sensitivity of the touch sensor with respect to a touch may be greater in the active mode 2010 than in the doze mode 2020. This is because, the doze mode is a mode for sensing "knockknock", while reducing power consumption, and the active mode 2010 may be a mode for accurately sensing a user input.

Meanwhile, the controller 180 may selectively switch the active mode 2010 to the sleep mode 2030 or the doze mode 2020 according to setting or conditions of the terminal. Namely, the doze mode 2020 may be executed instead of the sleep mode 2030 or the sleep mode 2030 may be executed instead of the doze mode 2020. For example, in a case in which the touch sensor is set to recognize "knockknock", the doze mode 2020 may be executed, and in a case in which the touch sensor is set not to recognize "knockknock", the sleep mode 2030 may be executed. This setting may be changed by the user.

Meanwhile, the terminal body may include a button for interchanging the active mode 2010 and the sleep mode 2030 or the active mode 2010 and the doze mode 2020, like a home button or a power button. When the button is pressed by the user, the controller 180 may change an operational state of the mobile terminal.

Also, in a case in which an event such as a call or message reception occurs in the sleep mode 2030 or the doze mode 2020, the controller 180 may execute the active mode 2010. Conversely, when a user input is not input during a pre-set period of time in the active mode 201, the controller 180 may execute the sleep mode 2030 or the doze mode 2020.

Meanwhile, in order to prevent a generation of malfunction due to "knockknock", the controller 180 may interconvert the doze mode 2030 and the sleep mode 2020. A conversion method will be described in detail with reference to the accompanying drawings.

Figure 22:
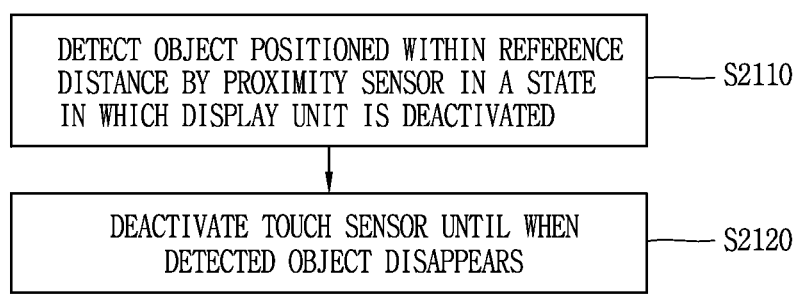
FIG. 22 is a flow chart illustrating a method of controlling the touch sensor using a proximity sensor in the method illustrated in FIG. 19.

FIG. 22 is a flow chart illustrating a method of controlling the touch sensor using a proximity sensor in the method illustrated in FIG. 19.

Referring to FIG. 22, the proximity sensor of the mobile terminal according to the exemplary embodiment of the present disclosure may sense an object positioned within a reference distance based on the display unit 151 or the vicinity of the display unit 151 in a state in which the display unit 151 is deactivated in step S2110.

The proximity sensor may be disposed in the vicinity of the display unit 151, and may sense an object that approaches the display unit 151 or an object positioned with a reference distance from the display unit 151. The reference distance may refer to a distance over which the user may not properly see the display unit 151 due to an object covering the display unit 151.

For example, the case in which an object is positioned within the reference distance from the display unit 151 may correspond to a case in which a front side of the terminal body on which the display unit 151 is disposed faces a table, a case in which a case protecting the terminal body covers the front surface of the display unit 151, a case in which the terminal is placed in a pocket of trousers or in a bag, or the like.

Next, whether to active the touch sensor may be determined according to whether an object is sensed by the proximity sensor in step S2120.

For example, in a case in which the proximity sensor senses an object positioned within the reference distance, the controller 180 may deactivate the touch sensor in the state in which the display unit 151 is deactivated. Namely, referring to FIG. 21, the controller 180 may switch the doze mode to the sleep mode.

In a case in which the object which has been sensed by the proximity sensor is not sensed any longer within the reference distance, namely, when the object which has been sensed by the proximity sensor disappears, the controller 180 may switch the sleep mode to the doze mode.

In this manner, in the mobile terminal according to the exemplary embodiment of the present disclosure, a setting related to the touch sensor may be changed according to whether an object positioned within a reference distance is sensed by the proximity sensor in a state in which the display unit 151 is deactivated. As described above, in the mobile terminal according to the exemplary embodiment of the present disclosure, the touch sensor is deactivated or periodically activated according to a state of the terminal, and thus, power consumption may be reduced.

Figure 23:
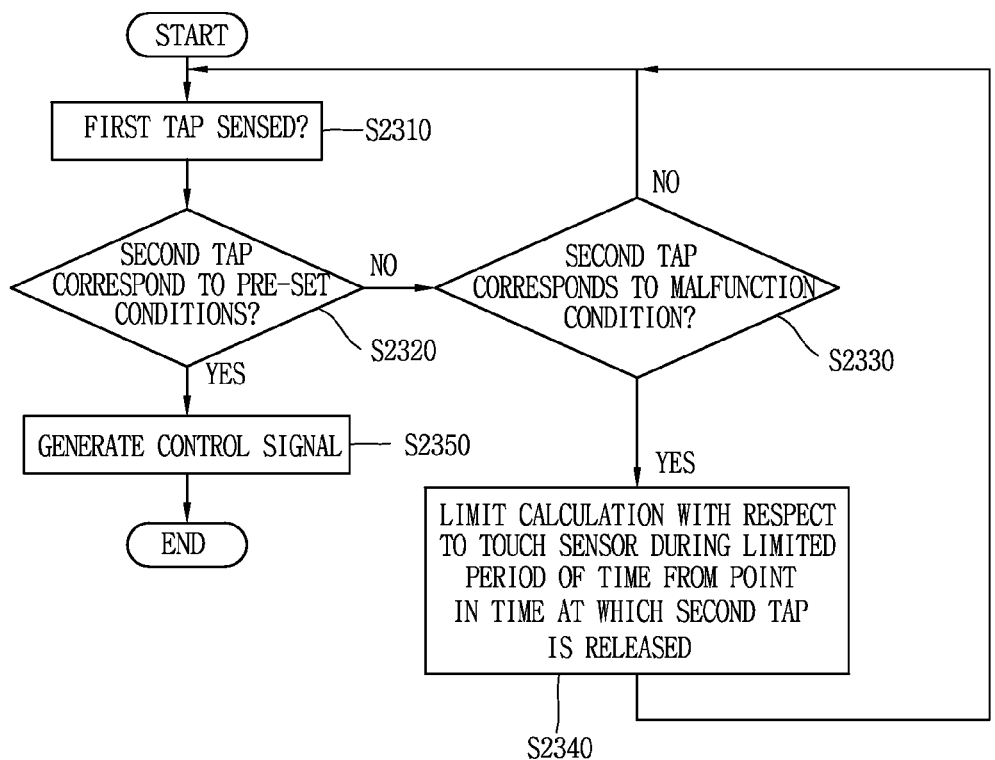
FIG. 23 is a flow chart illustrating a method of preventing malfunction in a mobile terminal according to an exemplary embodiment of the present disclosure.

Meanwhile, the mobile terminal may malfunction due to a tap or a touch not intended by the user. Namely, an unintentional function may be executed in the doze mode. FIG. 23 is a flow chart illustrating a method of preventing malfunction in a mobile terminal according to an exemplary embodiment of the present disclosure.

In a state in which the display unit 151 is deactivated, in a case in which a tap continuously applied to the display unit 151 is sensed, the controller 180 may control at least one function. In this case, the tap continuously applied to the display unit 151 may include a first tap and a second tap applied within a pre-set period of time after the first tap is applied.

First, referring to FIG. 23, the first tap may be sensed in step S2310. Next, in a case in which the second tap is successively sensed after the first tap, whether the second tap corresponds to pre-set conditions may be determined in step S2320.

For example, in a case in which at least two or more taps are applied to a predetermined region within the reference period of time, it may be determined to correspond to the pre-set conditions. Thus, in the case in which at least two or more (or a plurality of) taps are successively applied to a predetermined region within the reference period of time, the controller 180 or the touch sensor may determine that the second tap corresponding to the pre-set conditions has been sensed.

Meanwhile, in this case, the reference period of time may be very short time, and may be a period of time within 200 ms to 2 s, for example. Also, the predetermined region may be the same region to which the tap gestures have been applied, or may be a narrow region considered as the same spot.

Meanwhile, in a case in which the second tap does not correspond to the pre-set conditions, it may be determined that the second tap corresponds to a malfunction condition, namely, a pre-set invalidity condition in step S2330. However, the present disclosure is not necessarily limited thereto and although the second tap corresponds to the pre-set conditions, it may be determined whether the second tap corresponds to the invalidity condition.

In a case in which the second tap corresponds to the pre-set invalidity condition, although a tap corresponding to the pre-set method is sensed during a pre-set period of time after the second tap is sensed, the controller 180 may limit controlling with respect to at least one function in step S2340.

For example, when the sensed second tap corresponds to the invalidity condition, controlling of the function is not performed. In a specific example, in this case, the controller 180 may limit calculation with respect to the touch sensor during a limited period of time from a point in time at which the second tap is released, thus preventing malfunction.

For example, in a case in which the second tap is a gesture which is not released for a predetermined period of time in a state in which the second tap is in contact with the display unit 151, rather than a tap gesture applied to the display unit 151, the controller 180 may deactivate the touch sensor during the limited period of time after the second tap is released. Accordingly, a generation of malfunction of the mobile terminal may be prevented in advance.

In another example, in a case in which a number of taps greater than a reference number of time is successively applied, the controller 180 may not perform calculation with respect to a tap input during the limited period of time after the reference number of time. Namely, a different tap is successively sensed after the tap corresponding to the reference number of time, it corresponds to the invalidity condition, and thus, the function is not performed.

Figure 24:
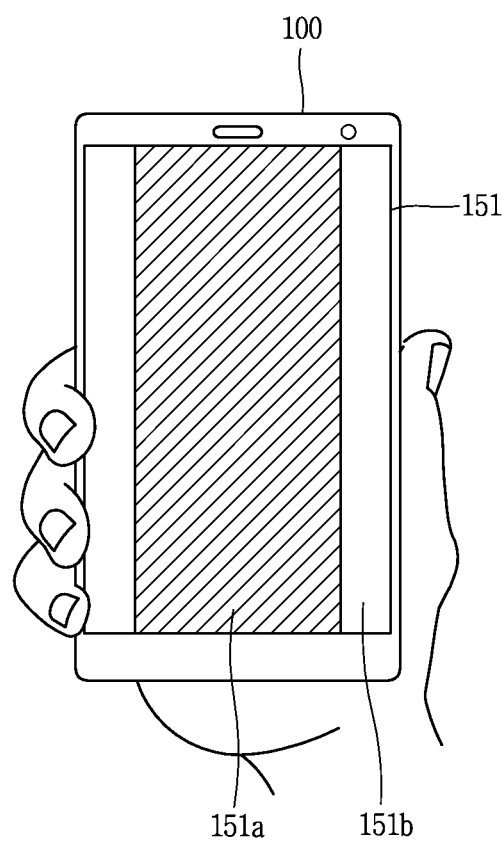
FIGS. 24 and 25 are conceptual views illustrating an operation example of deactivating a particular region of the touch sensor in a state in which the display unit is deactivated in the mobile terminal according to an exemplary embodiment of the present disclosure.
Figure 25:
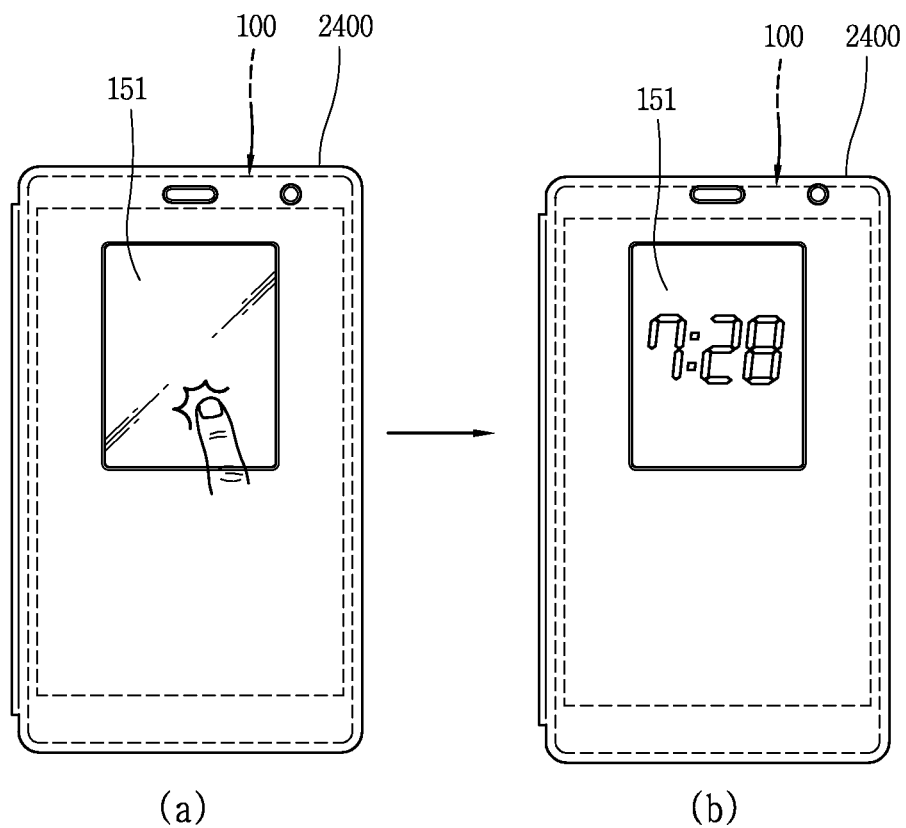

FIGS. 24 and 25 are conceptual views illustrating an operation example of deactivating a particular region of the touch sensor in a state in which the display unit is deactivated in the mobile terminal according to an exemplary embodiment of the present disclosure.

Referring to FIG. 24, the entire region of the display unit 151 may be divided into a particular region 151a for receiving a pre-set tap in a state in which the display unit 151 is deactivated, and a remaining region 151b other than the particular region 151a. For example, in a case in which the user holds the terminal, an unintentional touch may be generated due to the user's fingers holding the terminal body.

Thus, in a case in which the display unit 151 is deactivated, the controller 180 may control at least one function, the controller 180 may control at least one function in response to a tap applied to a pre-set particular region of the display unit 151. Namely, in a state in which the display unit 151 is deactivated, at least one region of the touch sensor may be deactivated.

Meanwhile, referring to FIG. 25, a partial region of the entire region of the display unit 151 may be covered by a case 2400, or the like. In this case, the touch sensor may distinguish the region covered by the case 2400 and other remaining region, and active at least one region of the touch sensor based on the distinguished regions.

In this case, in a case in which a pre-set tap is applied to the region in which the touch sensor is activated, the controller 180 may output screen information to the display unit 151 in response to the applied tap.

Meanwhile, the controller 180 may activate only the region not covered by the case 2400 in the entire region of the display unit 151, and output screen information to the activated region.

As described above, in the mobile terminal according to the exemplary embodiment of the present disclosure, a tap may be sensed by at least one of the accelerometer and the touch sensor included in the sensing unit 140. Here, the accelerometer is a sensor for measuring dynamic force such as acceleration, vibration, impact, or the like, of the terminal body.

Namely, the accelerometer may determine whether a tap is applied to an object by sensing a movement (or vibration) of the terminal body generated by a tap gesture. Thus, the accelerometer may sense a tap applied to the terminal body or a tap applied to an object positioned as close as the terminal body enough to sense whether a movement or vibration is generated in the terminal body.

In this manner, the accelerometer may sense a tap applied to a spot outside of the terminal body, as well as a tap applied to the terminal body, as long as a movement or a vibration of the terminal body is sensed.

Meanwhile, in the mobile terminal according to the exemplary embodiment of the present disclosure, in order to sense a tap through the accelerometer or the touch sensor, the mobile terminal may be operated in a specific mode in which minimum current or power is consumed. The specific mode may be referred to as a doze mode. Thus, in the mobile terminal according to the exemplary embodiment of the present disclosure, in a state in which lighting of the display unit 151 is turned off or in the doze mode, a touch corresponding to a tap applied to the terminal body may be sensed by the touch sensor or a tap applied to the terminal body or an object in the vicinity of the terminal body may be sensed by the accelerometer.

In the mobile terminal according to the exemplary embodiment of the present disclosure, in order to sense a tap applied to the body of the mobile terminal, only any one of the accelerometer and the touch sensor may be used, the accelerometer and the touch sensor may be sequentially used, or both the accelerometer and the touch sensor may be used simultaneously. Meanwhile, a mode in which only the accelerometer is used to sense a tap may be referred to as a first mode, a mode in which only the touch sensor is used to sense a tap may be referred to as a second mode, and a mode in which both the accelerometer and the touch sensor are used may be referred to as a third mode or a hybrid mode.

Meanwhile, in a case in which a tap is sensed by the touch sensor, a position to which the tap is applied may be more accurately recognized.

As described above, in the mobile terminal according to the exemplary embodiment of the present disclosure, functions of the mobile terminal may be controlled in response to "knockknock". Thus, a user interface allowing for simply controlling functions of the mobile terminal may be used.

Also, in the mobile terminal according to the exemplary embodiment of the present disclosure, different functions may be controlled according to characteristics of "knockknock" or different configuration information may be changed. Thus, the user may control various functions by variously applying "knockknock".

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

What is claimed is:

1. A mobile terminal, comprising:
   a display;
   a touch sensor configured to detect a touch input on the display; and
   a controller configured to:
   activate the display and periodically drive the touch sensor with a first period,
   deactivate the display in response to a predetermined condition and periodically drive the touch sensor with a second period greater than the first period,
   detect a first tap input applied on the touch sensor in state of the deactivated display,
   determine a region of the display that corresponds to the first tap input,
   detect a second tap input applied on the touch sensor in state of the deactivated display within a predefined time period from the first tap input,
   determine if the second tap input is applied within the region,
   in response to the second tap input being applied within the region of the display that corresponds to the first tap input, activate the display and periodically drive the touch sensor with the first period, and
   in response to the second tap input being applied to a spot outside the region of the display that corresponds to the first tap input, maintain the deactivation of the display and periodically drive the touch sensor with the second period.

2. The mobile terminal of claim 1, wherein the controller is further configured to continue to drive the touch sensor with the second period until the second tap input is applied within the region of the display that corresponds to the first tap input.

3. The mobile terminal of claim 1, wherein the determined region corresponds to a narrow region considered as a same spot as the first tap input.

4. The mobile terminal of claim 1, wherein the predefined time period is 200 milliseconds to 2 seconds.

5. The mobile terminal of claim 1, wherein the second period corresponds to the touch sensor being deactivated a predetermined number of times per second.

6. The mobile terminal of claim 5, wherein the predetermined number of times per second includes at least 20 times per second.

7. The mobile terminal of claim 1, wherein the periodically driving the touch sensor with the first period corresponds to driving the touch sensor with a first power mode,
   wherein the periodically driving the touch sensor with the second period corresponds to driving the touch sensor with a second power mode, and
   wherein a power consumption of the first power mode is greater than a power consumption of the second power mode.

8. The mobile terminal of claim 1, wherein the controller is further configured to:
   display a home screen on the activated display in which the touch screen is driven with the first period, wherein the home screen includes a first region having at least one icon and a second region having an empty space,
   detect a third tap input applied to the second region of the home screen,
   detect a fourth tap input applied on the second region of the home screen within a predefined time period from the third tap input, and
   in response to the fourth tap input being applied on the second region of the home screen within the predefined time period from the third tap input, deactivate the display and periodically drive the touch sensor with the second period greater than the first period.

9. The mobile terminal of claim 8, wherein the periodically driving the touch sensor with the first period corresponds to driving the touch sensor with a first power mode,
   wherein the periodically driving the touch sensor with the second period corresponds to driving the touch sensor with a second power mode, and
   wherein a power consumption of the first power mode is greater than a power consumption of the second power mode.

10. The mobile terminal of claim 1, wherein the display and the touch sensor are driven in the following drive states:
    a drive state A in which the touch sensor is in an active mode and the display is activate;
    a drive state B in which the touch sensor is in a doze mode and the display is deactivated; and
    a drive state C in which the touch sensor is in a sleep mode and the display is deactivated.

11. The mobile terminal of claim 10, wherein the doze mode corresponds to the touch sensor being driven with the second period, and
    wherein the active mode corresponds to the touch sensor being driven with the first period.

12. The mobile terminal of claim 11, wherein the sleep mode corresponds to the touch sensor and the display being deactivated.

13. The mobile terminal of claim 10, wherein the controller is further configured to:
    switch from the drive state B to the drive state A in response to the second tap input being applied within the region of the deactivated display that corresponds to the first tap input within the predefined time period from the first tap input, and
    maintain the drive state B until the second tap input is applied within the region of the deactivated display that corresponds to the first tap input within the predefined time period from the first tap input.

14. The mobile terminal of claim 10, wherein the controller is further configured to switch from the drive state A to the drive state B in response to the predetermined condition.

15. The mobile terminal of claim 1, wherein the controller is further configured to:
- detect a third tap input applied on the deactivated display within the predefined time period from the first tap input,
- determine if the third tap input is applied within the region, and
- in response to the third tap input being applied within the region of the display that corresponds to the first tap input and the second tap input, maintain the deactivation of the display and periodically drive the touch sensor with the first period.

* * * * *